Nov. 11, 1969         A. C. DAVIS         3,477,198
PACKER ASSEMBLY
Filed Sept. 8, 1967                       15 Sheets-Sheet 1
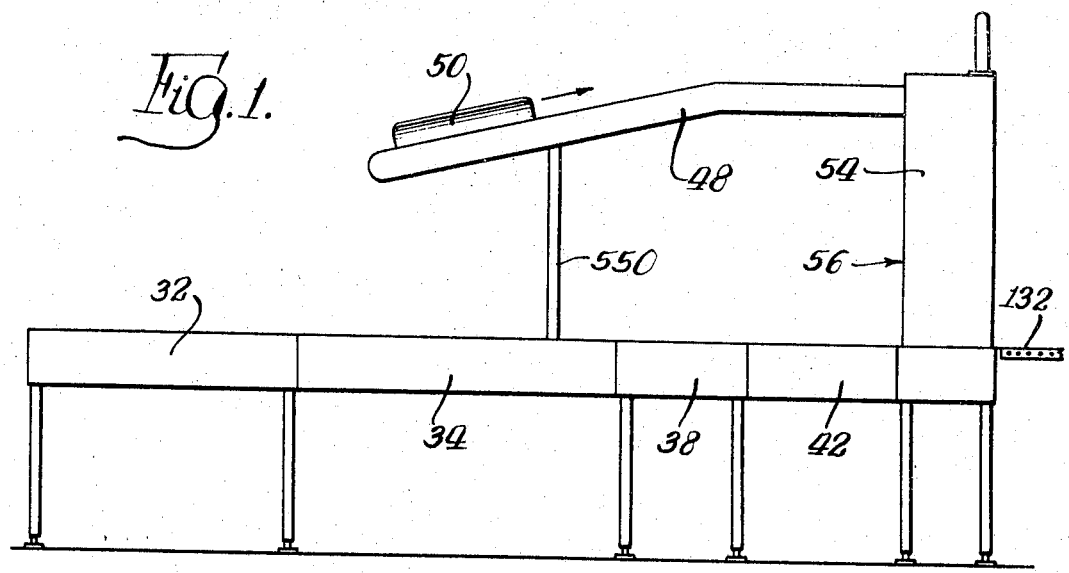
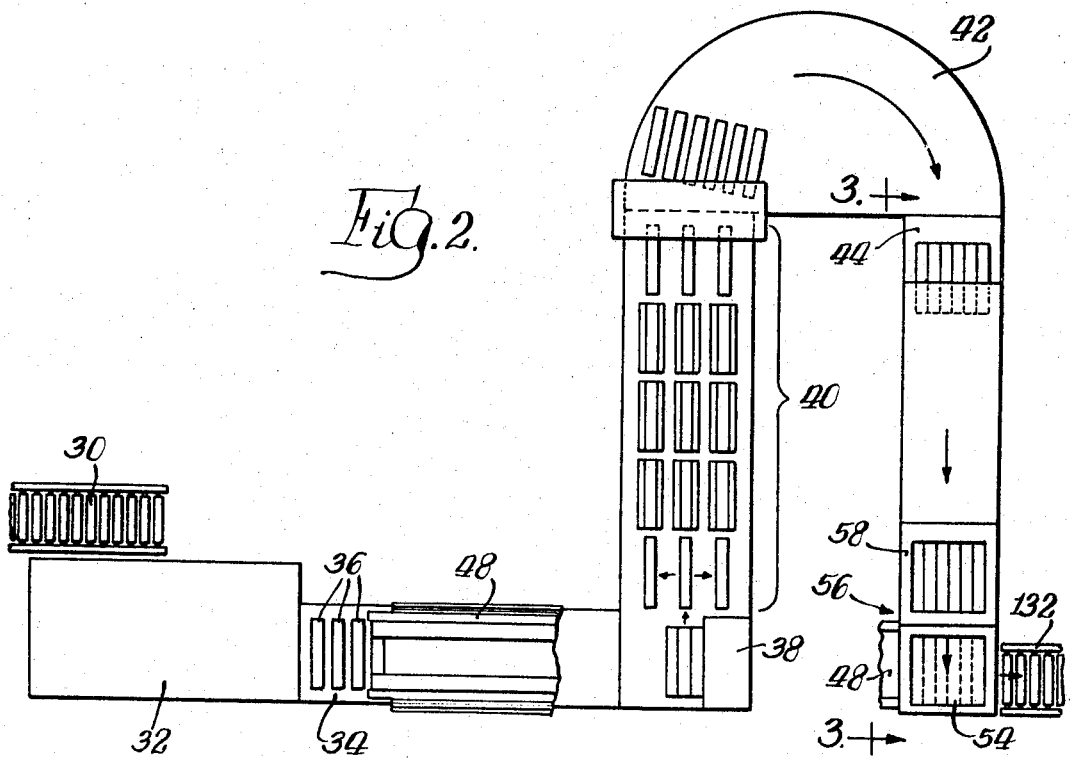
Inventor:—
Allan C. Davis,
By Hibben, Noyes & Bicknell
Attys.

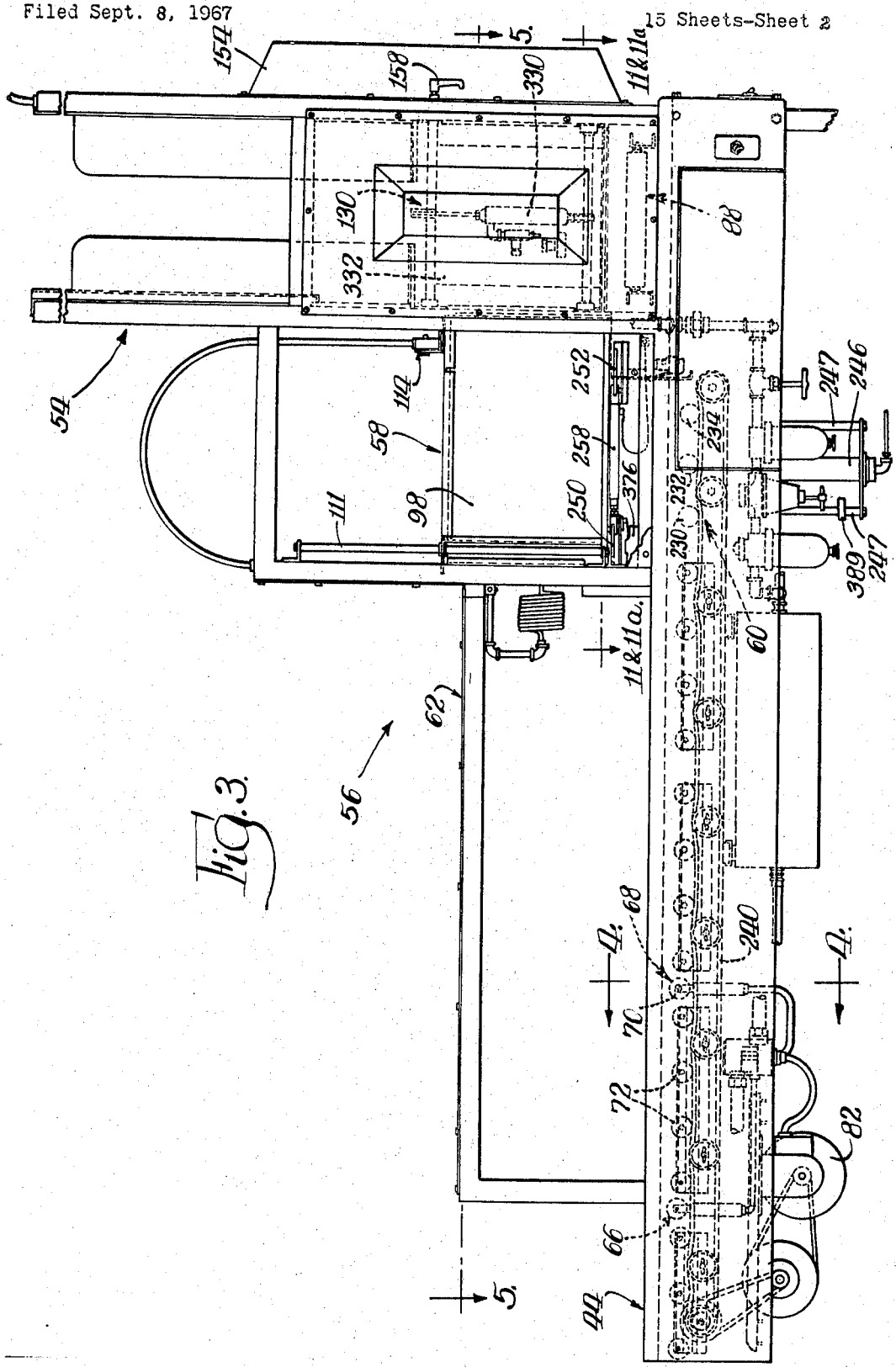

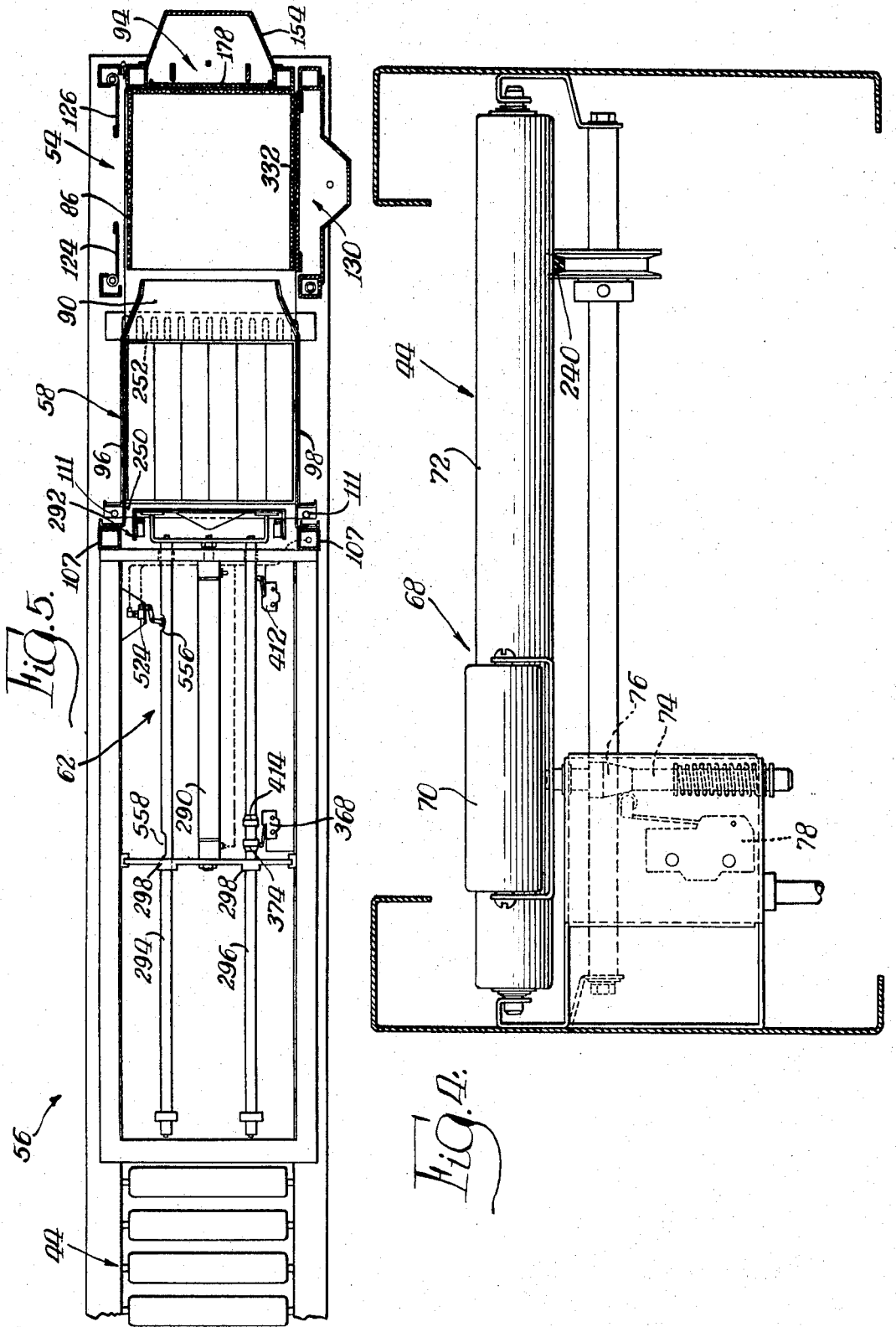

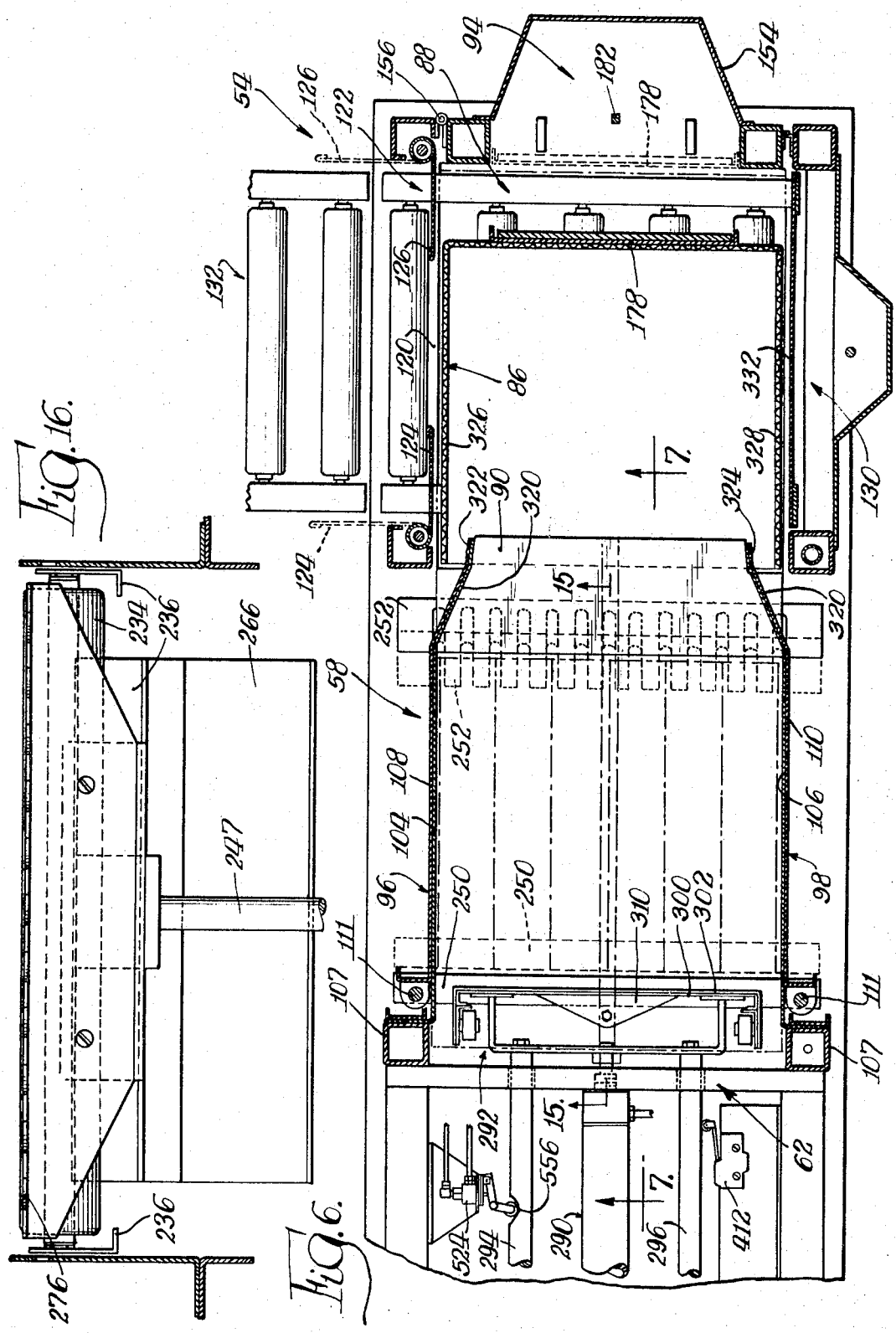

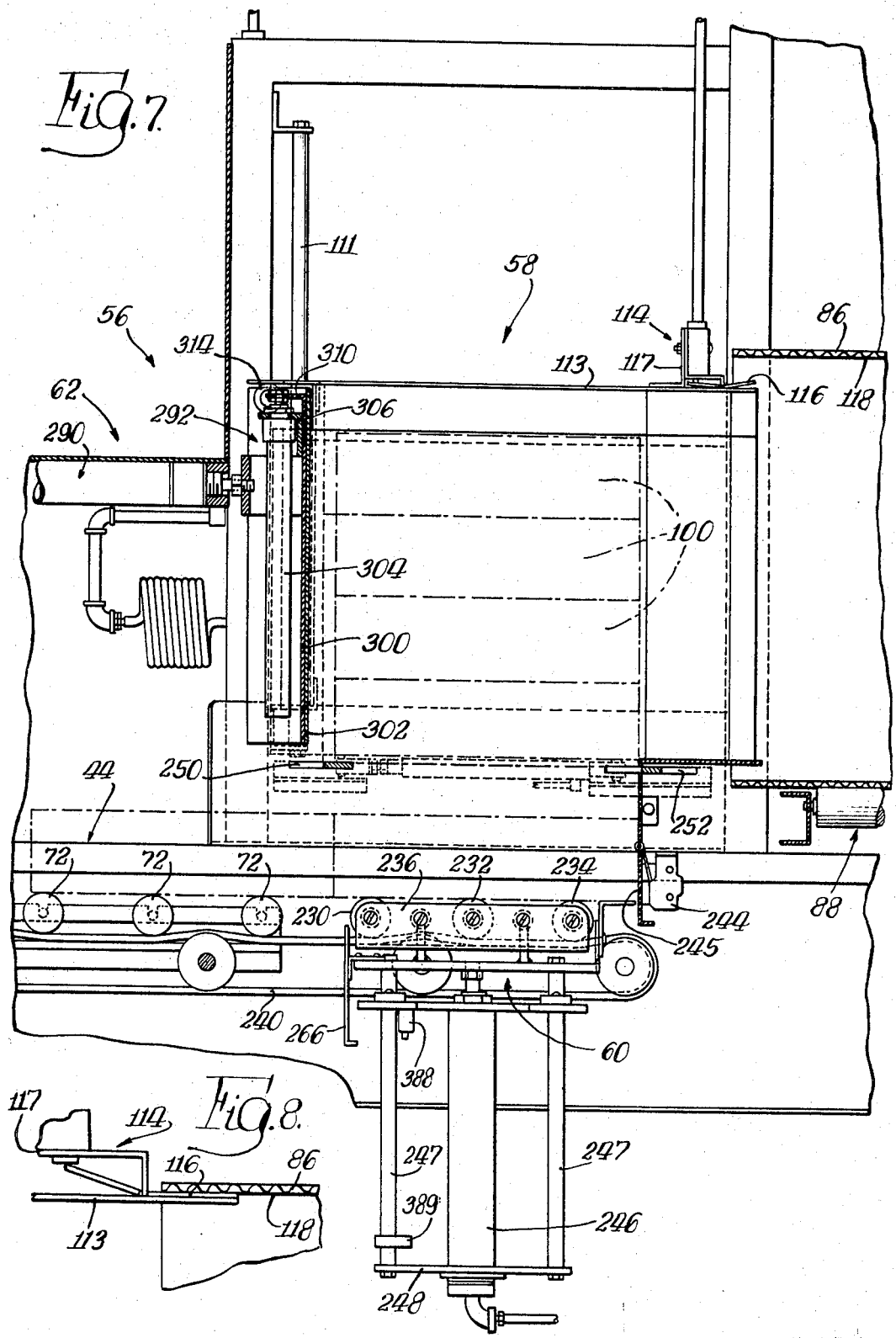

Nov. 11, 1969
A. C. DAVIS
3,477,198
PACKER ASSEMBLY
Filed Sept. 8, 1967
15 Sheets-Sheet 6
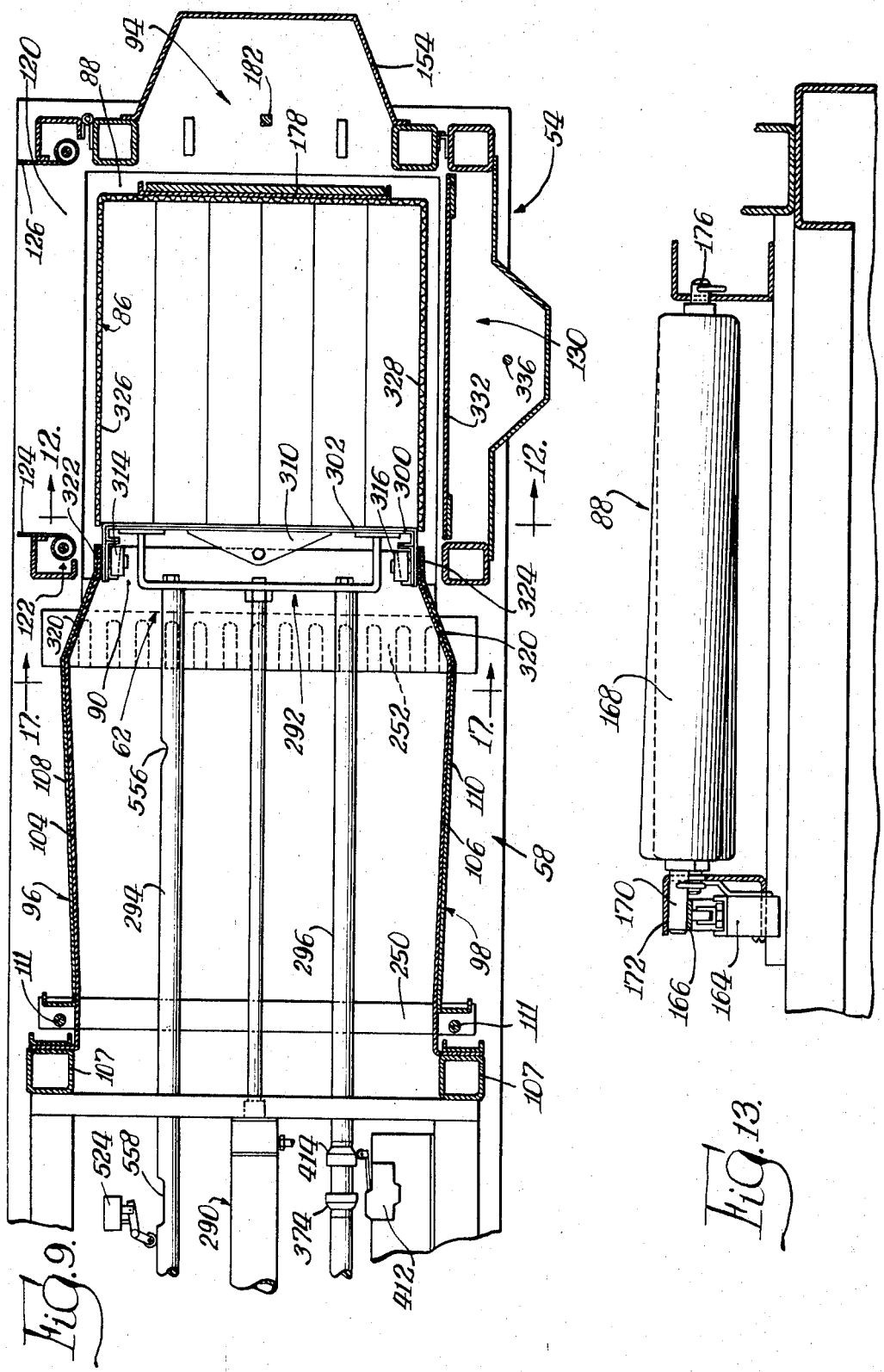

Nov. 11, 1969     A. C. DAVIS     3,477,198
PACKER ASSEMBLY
Filed Sept. 8, 1967     15 Sheets-Sheet 7

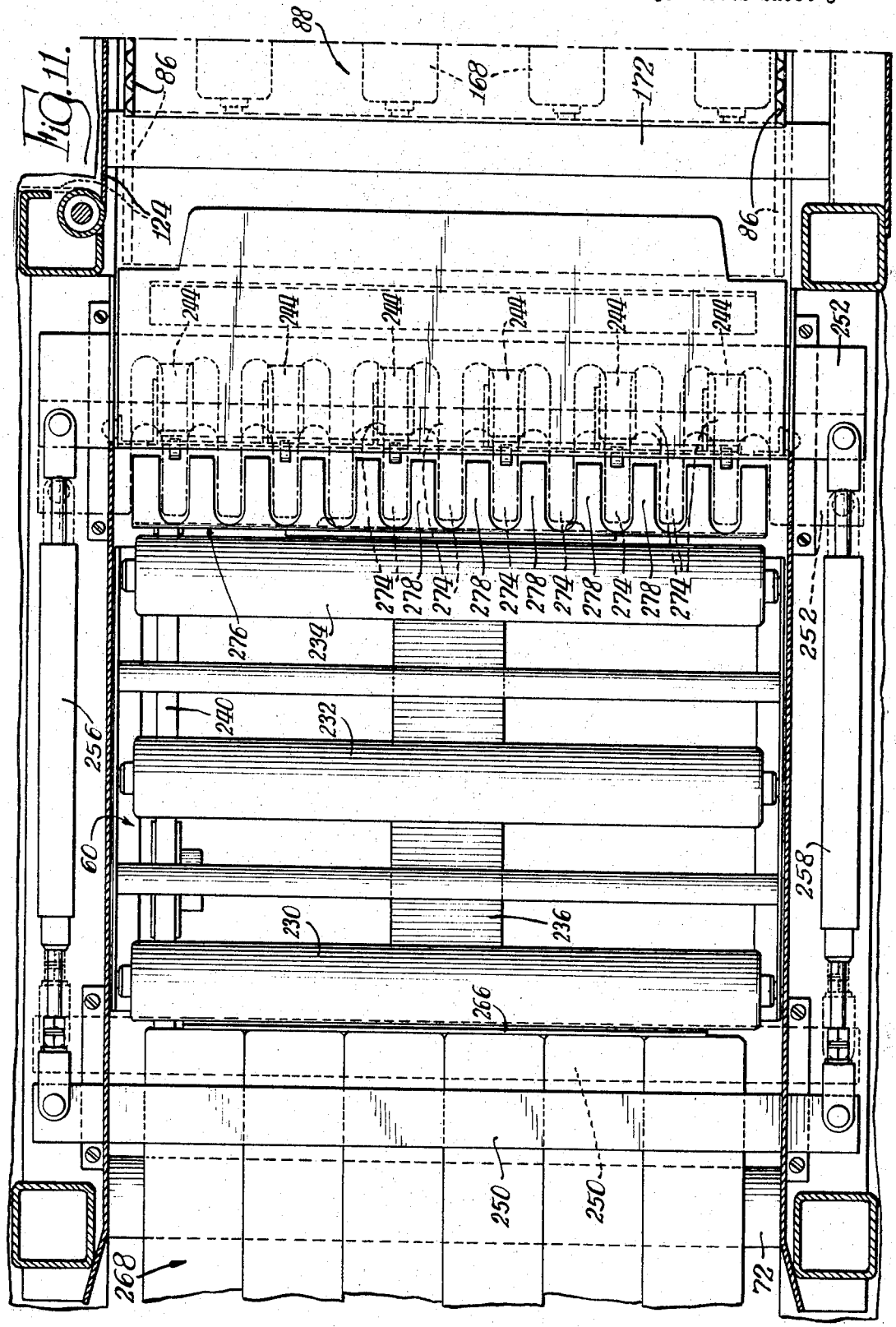

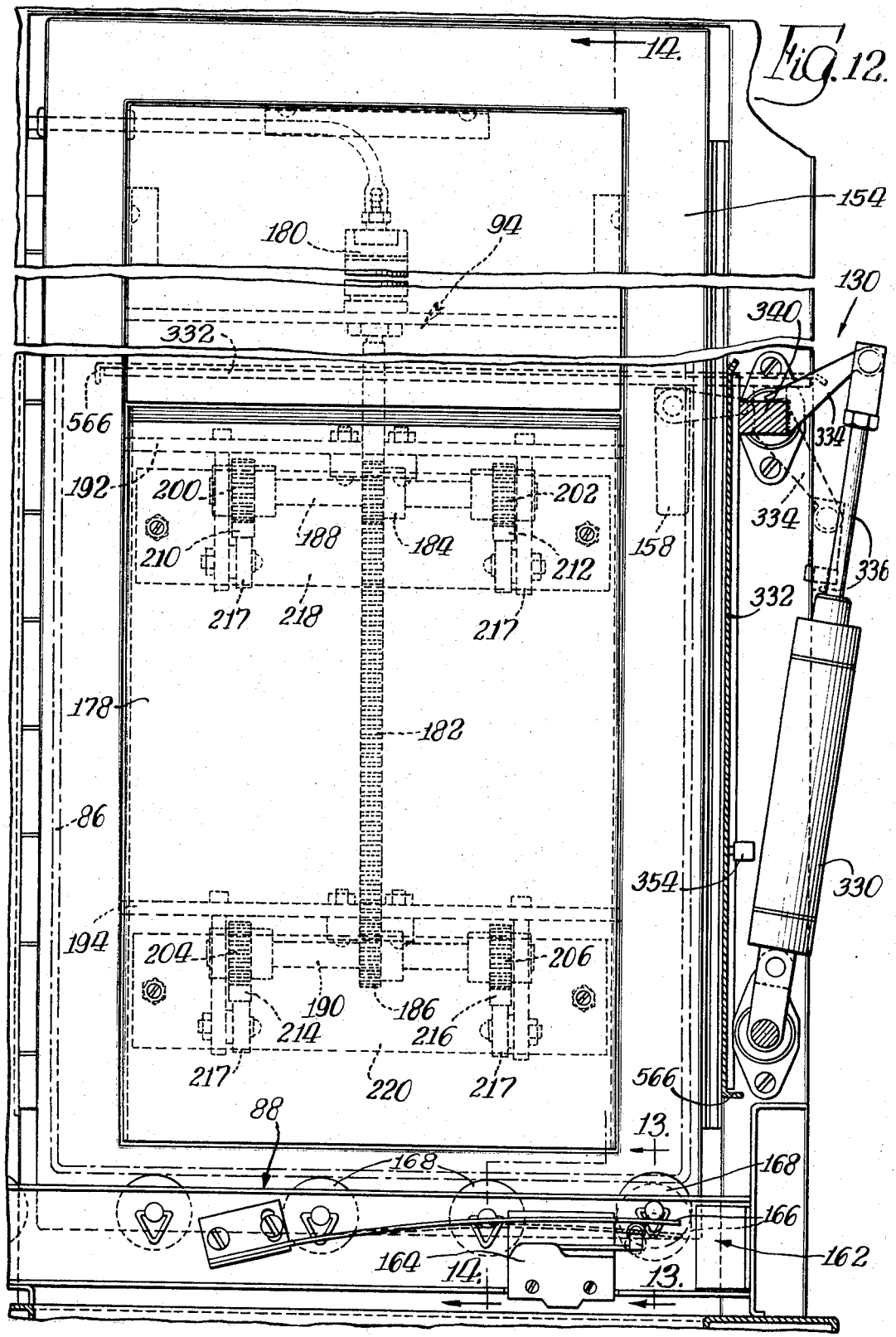

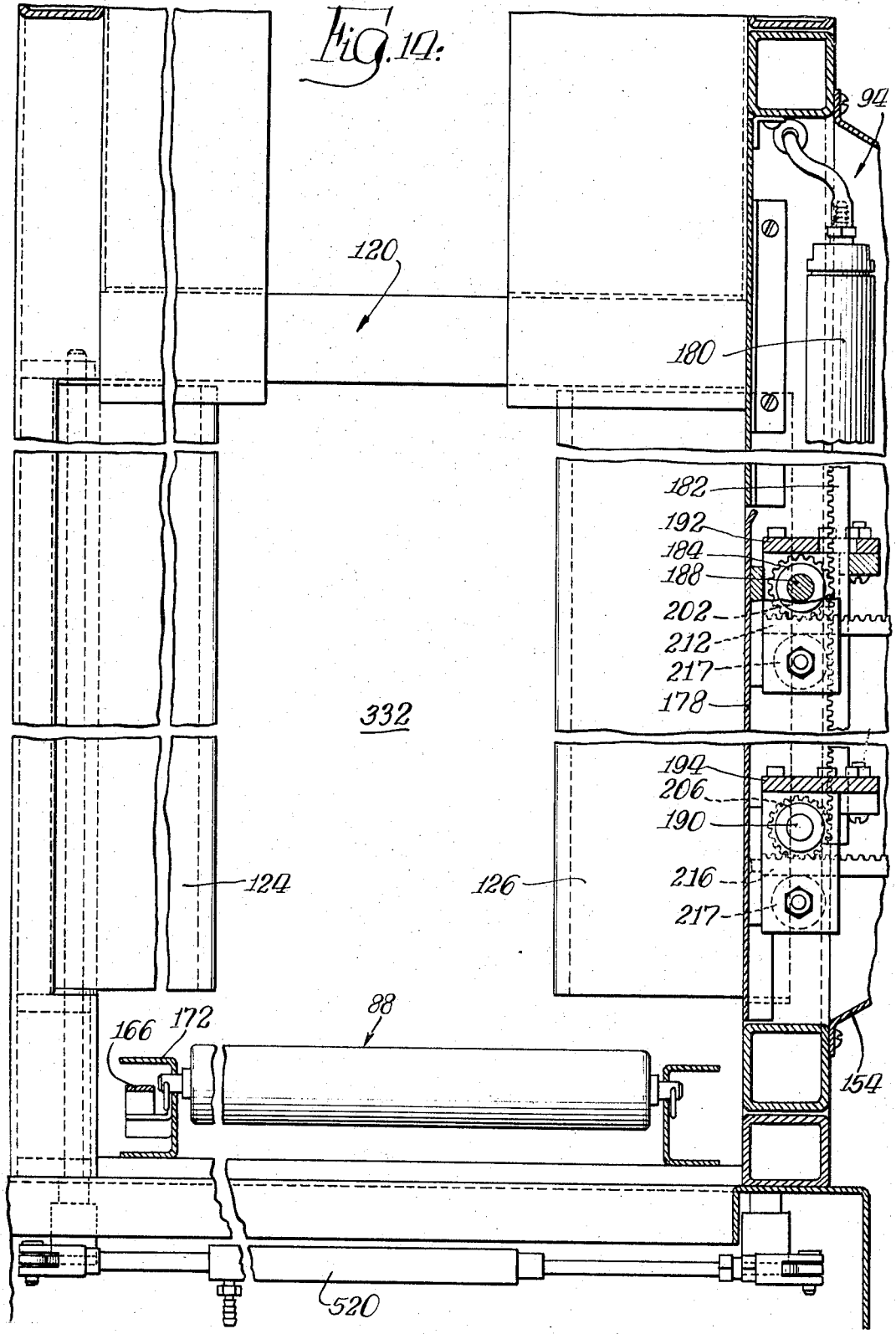

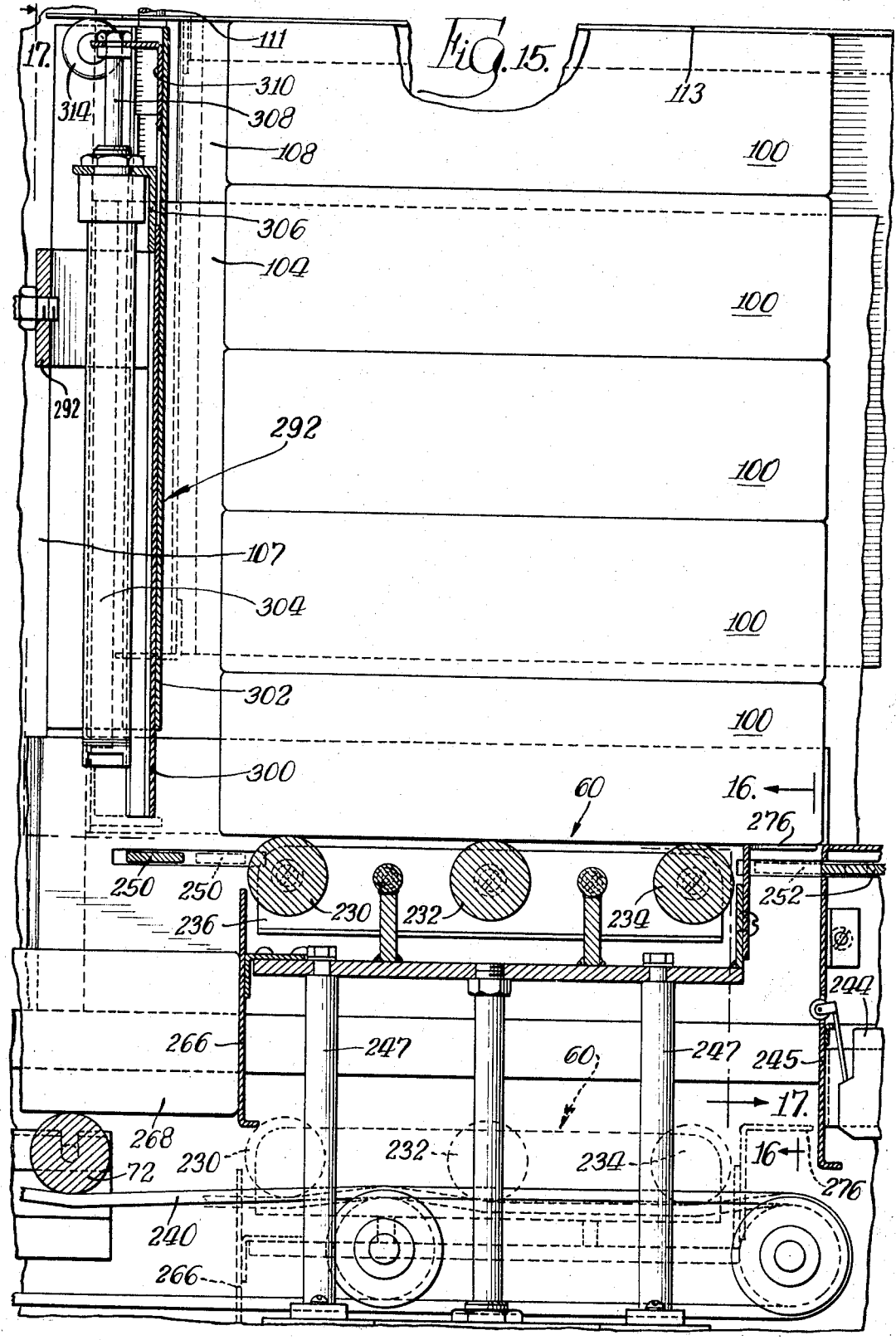

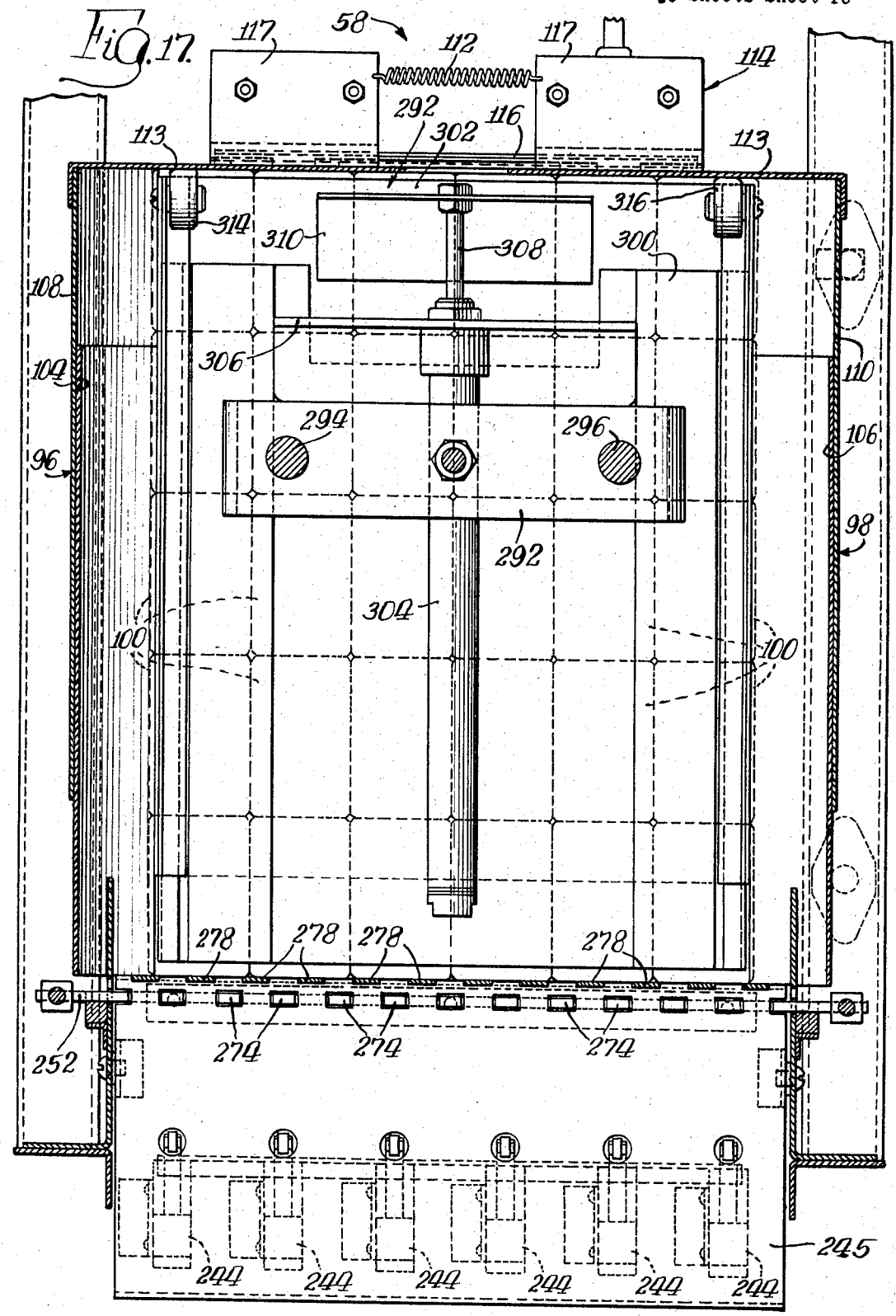

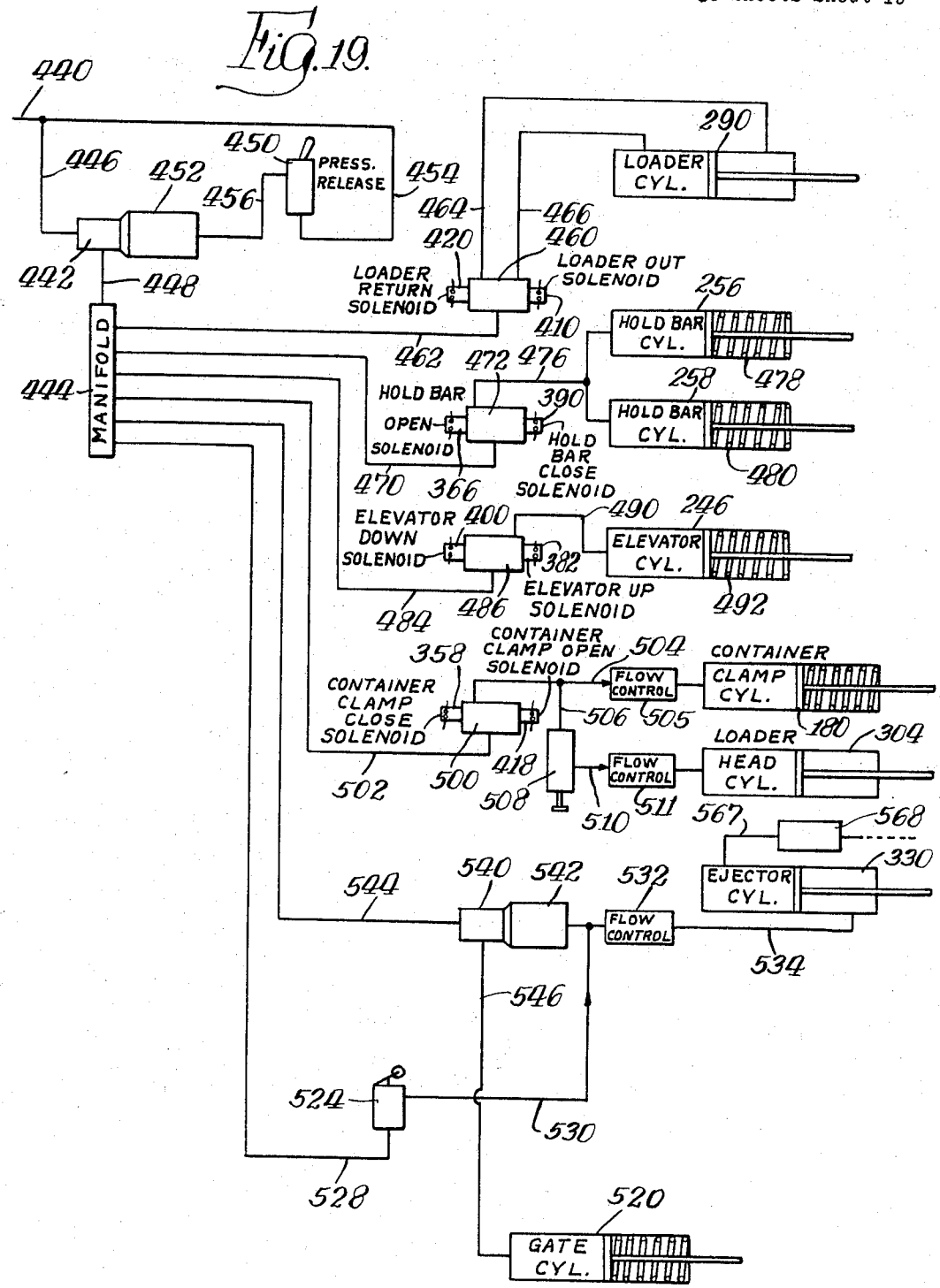

United States Patent Office 3,477,198
Patented Nov. 11, 1969

3,477,198
PACKER ASSEMBLY
Allan C. Davis, Baltimore, Md., assignor to The Meyercord Co., Wheaton, Ill., a corporation of Illinois
Filed Sept. 8, 1967, Ser. No. 666,521
Int. Cl. B65b *57/14, 35/52, 43/44*
U.S. Cl. 53—55                                34 Claims

ABSTRACT OF THE DISCLOSURE

This disclosure relates generally to a packer assembly for filling a container with a plurality of articles or cartons. The packer assembly includes a container positioning tower or structure which receives empty containers for movement onto a loading platform. A plurality of tiers or layers of cartons are accumulated in a magazine and are moved into an empty container on the loading platform by a loader or pusher assembly to pack or fill the container. The magazine and pusher assembly are expandable to enable cartons of varying sizes to be packed into containers of varying sizes. An ejector assembly is provided for moving the filled container off the loading platform and positioning a next succeeding container on the loading platform.

DISCLOSURE

Many states and municipalities require that revenue or tax stamps or transfers be applied to packages of cigarettes before the cigarettes are sold at retail outlets to the general public. These tax stamps are usually sold by the state or municipality to wholesale distributors who apply the tax stamps to the package of cigarettes. In order to apply the tax stamps, the wholesalers must first open shipping cases or containers which normally contain sixty cartons of cigarettes. After the cartons of cigarettes have been removed from the shipping container and opened, the tax stamps are applied to the packages of cigarettes in the cartons, and the cartons are closed and sealed. Finally, the closed cartons of cigarettes are repacked in the shipping containers for transporting to retailers. One machine for opening the cartons, applying tax transfers to the packages of cigarettes, and closing the cartons is shown in my application Ser. No. 690,346 filed Dec. 13, 1967 and entitled "Transfer Applying Apparatus."

It is a common practice to repack the shipping containers by manually placing the closed cartons of stamped cigarette packages back into the empty shipping container. The manual filling or packing of each shipping container with sixty cartons of cigarettes is difficult and time consuming since the cartons must be neatly arranged in tiers or layers in the shipping container. This manual filling of a shipping container with cartons of cigarettes becomes particularly burdensome when a machine is used to automatically stamp the packages of cigarettes at a rapid rate. However, the development of apparatus or machines for automatically repacking cartons of cigarettes into containers, and thereby eliminating manual repacking, has been severely hampered by the necessity of handling containers and cartons of varying sizes, that is cartons of "regular," "king-size," and "imperial" length cigarettes and their associated shipping containers.

In view of the foregoing remarks it can be seen that the manual filling of shipping containers with cartons of cigarettes is both time consuming and difficult. Therefore, it is an object of this invention to provide a packer assembly for automatically filling containers with cartons of cigarettes.

Another object of this invention is to provide a novel and improved packer assembly for automatically positioning a container, accumulating a plurality of tiers or layers of articles for insertion into the container, and loading or packing the accumulated articles into the container.

Another object of this invention is to provide a packer assembly for sequentially loading or packing a plurality of containers with articles of varying sizes, such as cartons of "regular," "king-size," and "imperial" length cigarettes.

These and other objects and features of the invention will become more apparent upon a reading of the following detailed description taken in connection with the accompanying drawings wherein:

FIG. 1 is a schematic elevational illustration of apparatus for use when opening a container, removing a plurality of cartons from the opened container, applying transfers to packages within the cartons, and packing the cartons back in the container;

FIG. 2 is a schematic plan illustration of the apparatus of FIG. 1;

FIG. 3 is an elevational view of a packer assembly forming a portion of the apparatus of FIGS. 1 and 2, the packer assembly being operable to automatically fill a container with a plurality of cartons;

FIG. 4 is an enlarged sectional view, taken along the line 4—4 of FIG. 3, illustrating a switch assembly for sensing a jam or back-up of cartons in the packer assembly;

FIG. 5 is a sectional view, taken along the line 5—5 of FIG. 3, illustrating the packer assembly with a shipping container or case located on a loading platform in an initial position spaced apart from a magazine in which tiers or layers of cartons are accumulated;

FIG. 6 is an enlarged sectional view, similar to FIG. 5 illustrating the container in a loading position overlapping sidewalls of the magazine;

FIG. 7 is an enlarged sectional view, taken along the line 7—7 of FIG. 6, illustrating an elevator, shown in a lowered position, for lifting the cartons into the magazine where the cartons are accumulated in tiers or layers prior to insertion into a container on the loading platform;

FIG. 8 is an enlarged sectional view illustrating the actuation of a sensor unit on the magazine by engagement of the sensor unit with an inner surface of the container on the loading platform to thereby indicate the accumulation of sufficient tiers of cartons in the magazine to fill or pack the container;

FIG. 9 is an enlarged sectional view, similar to FIG 6, illustrating a pusher or loader assembly for moving the accumulated tiers of cartons from the magazine into the container on the loading platform, the loading assembly being shown in an extended position after having pushed a plurality of tiers of cartons from the magazine into the container;

FIG. 11 is an enlarged sectional view, taken along the line 11—11 of FIG. 3, of the magazine and elevator;

FIG. 12 is an enlarged elevational sectional view of a container clamp or positioning assembly a sensor unit for detecting the presence of a case or container on the loading platform, and an ejector assembly for moving a filled or packed container off the loading platform and lowering a next succeeding empty container onto the loading platform;

FIG. 13 (on Sheet 6 of the drawings) is a sectional view, taken along the line 13—13 of FIG. 12, further illustrating the structure of the sensor unit for detecting the presence of a container on the loading platform;

FIG. 14 is an enlarged sectional view, taken along the line 14—14 of FIG. 12, illustrating the container positioning assembly and a gate assembly through which the filled or packed containers are moved off the loading platform;

FIG. 15 is an enlarged elevational sectional view, taken along the line 15—15 of FIG. 6, illustrating the magazine, the elevator in a raised position, and a head or end section of the loader assembly;

FIG. 16 (on Sheet 4 of the drawings) is an enlarged sectional view, taken along the line 16—16 of FIG. 15, further illustrating the structure of the elevator;

FIG. 17 is an enlarged sectional view, taken along the line 17—17 of FIG. 15, further illustrating the head section of the loader assembly and the magazine;

FIG. 19 is a schematic illustration of a pneumatic control circuit for the packer assembly.

GENERAL DESCRIPTION

Figure 10:
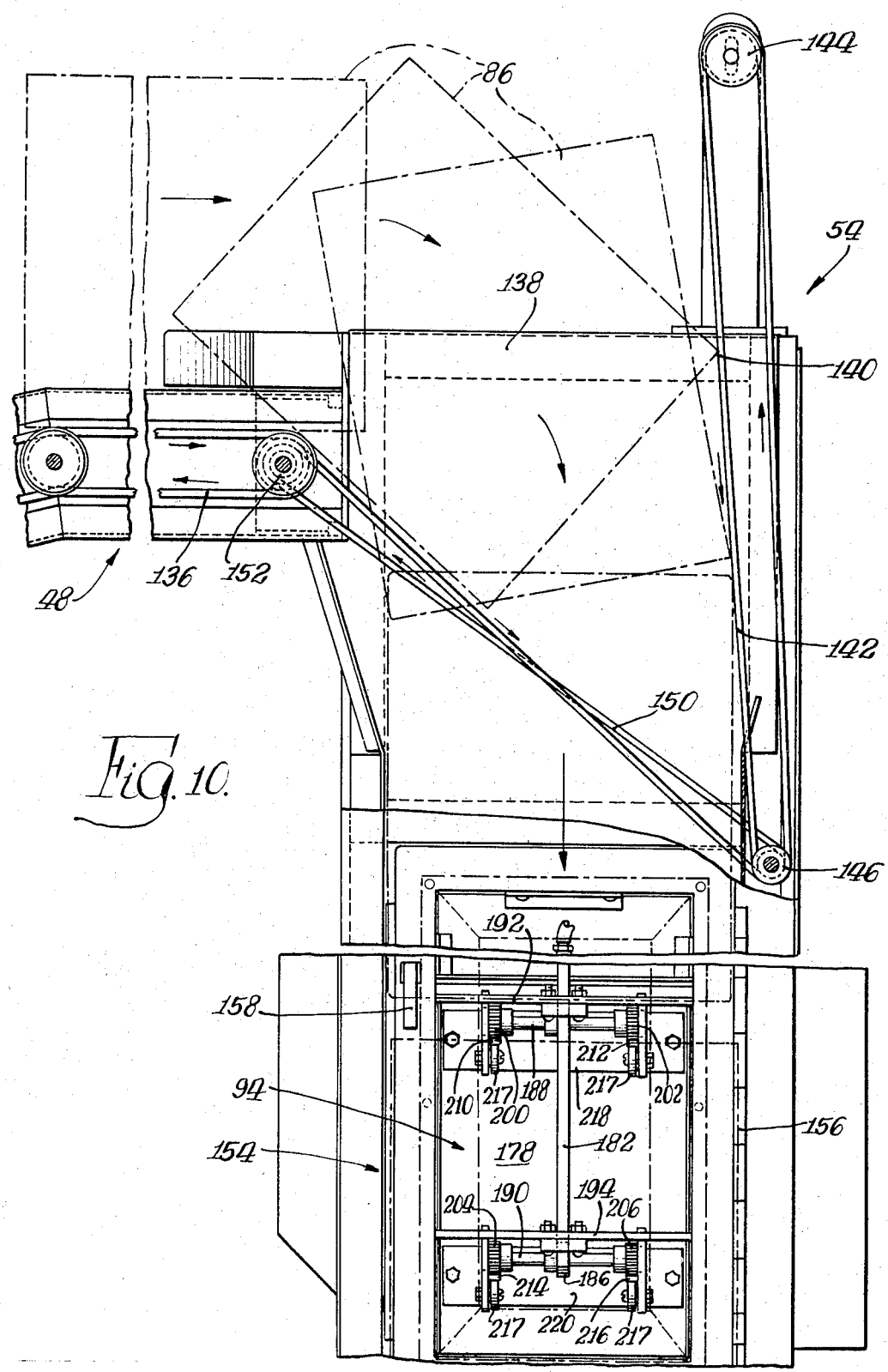
FIG. 10 is an enlarged sectional view, illustrating the loading of an empty container into a container receiving tower or structure which extends upwardly from the loading platform.

Processing equipment is shown in FIGS. 1 and 2 for use in unpacking containers of cartons of cigarettes, applying tax stamps to packages of cigarettes within cartons, and repacking the cartons into containers. The processing equipment includes a supply conveyor 30 upon which shipping containers holding cartons of cigarettes are transported to an unloading table or station 32. The shipping container can be opened, before being placed on the conveyor 30 or at the unloading table 32, by cutting or severing the shipping container midway between its ends to provide a pair of half sections or containers. Each of these half sections or containers holds thirty cartons of cigarettes arranged in five layers of six cartons. Hereinafter, the word container or case will be used in illustrating the invention to refer to the half sections of the severed shipping container.

The cartons of unstamped packages of cigarettes are unloaded from the containers and placed on a conveyor 34, as indicated at 36 in FIG. 2. The cartons are transported by the conveyor 34 to a loading station 38. The cartons are then moved in groups of three through carton opening, transfer applying and carton closing apparatus indicated generally at 40 in FIG. 2. The apparatus 40 is more fully disclosed in my aforementioned application Ser. No. 690,346 entitled "Transfer Applying Apparatus" and filed on Dec. 13, 1967. The closed cartons of stamped packages of cigarettes are then accumulated on an arcuate group conveyor or transfer table 42 in laterally extending groups of six cartons. The groups of six cartons are moved along the transfer table 42 to a packer supply or carton conveyor 44.

While the cartons of cigarettes are being processed in the previously described manner, the empty containers are placed on an overhead container conveyor 48, as indicated at 50 in FIG. 1. Each of the containers is oriented on the conveyor 48 with an open end of the container facing into the drawing as viewed in FIG. 1 or toward the apparatus 40 as viewed in FIG. 2. The empty containers are transported by the conveyor 48 to an elongated upwardly extending container receiving tower or structure 54 of a packer assembly or apparatus 56. The empty containers are accumulated or stacked in the tower 54 and descend one at a time onto a loading platform at the base of the tower with the open ends of the containers facing a carton magazine or accumulator 58 (see FIG. 3).

Meanwhile, the groups of cartons are moved, one group at a time, onto an elevator 60 (see FIG. 3) by the conveyor 44. The elevator 60 is located immediately beneath the magazine 58 and sequentially lifts the groups of cartons into the magazine where each group forms a tier or layer of cartons. After enough cartons have been accumulated in the magazine 58 to fill a container, in the present instance five tiers of six cartons each, a case lot pusher or loader assembly 62 (see FIG. 5) is operated. The loader assembly 62 pushes the tiers of cartons into the container on the loading platform to fill or pack the container with the cartons of stamped packages of cigarettes.

A pair of back-up or jam sensor switch assemblies 66 and 68 are mounted along the conveyor 44 as shown in FIG. 3. The sensor switch assemblies 66 and 68 interconnect the packer assembly 56 and the apparatus 40 to disable the apparatus 40 when a jam or back-up occurs in the packer assembly 56. The sensor switch assembly 68 is shown in FIG. 4 and includes a roller 70 which extends above rollers 72 of the conveyor 44. The roller 70 is connected to a downwardly extending shaft or stem 74 having an annular cam 76. The cam 76 actuates a normally closed switch 78 to open the switch each time a carton moves across the roller 70. The sensor assembly 66 is constructed in the same manner as the sensor assembly 68.

The normally closed switches of the sensor assemblies 66 and 68 are connected in parallel in a circuit for energizing the apparatus 40. Therefore, when the switches for both sensor assemblies 66 and 68 are opened the apparatus 40 is disabled and the groups of cartons are not transported to the conveyor 44 which is continuously driven by a motor 82. It should be noted that the rollers for both of the sensor assemblies 66 and 68 will be depressed at the same time only when there is a back-up of groups of cartons in the packer assembly 56. In this way, the sensor assemblies 66 and 68 insure that when a back-up or jam does occur in the packer assembly 56 the apparatus 40 will be shut down rather than moving additional groups of cartons into the packer assembly to increase the size of the back-up.

In accordance with the present invention, the packer assembly 56 accumulates a plurality of tiers or layers of cartons in the magazine 58 and packs the accumulated cartons into an empty container, indicated at 86 in FIG. 5. The filled or packed container is then ejected from the packer assembly and a next succeeding container is lowered onto the loading platform 88 (see FIG. 3) and filled or packed with subsequently accumulated tiers of cartons. The empty container 86 is initially positioned on the loading platform 88 in a spaced apart relationship with an open end or generally funnel shaped mouth 90 of the magazine 58 (see FIG. 5). An empty container clamp or positioning assembly 94 is mounted adjacent to the loading platform 88 on a side opposite from the magazine 58. The container positioning assembly 94 is operated to move the empty container 86 from the initial position of FIG. 5 to a loading position, shown in FIG. 6, wherein the container is located in an overlapping or generally telescopic relationship with the open end 90 of the magazine 58. When the container 86 is in the loading position, opposite side walls or panels 96 and 98 of the magazine 58 extend into the container 86 to guide the movement of the tiers of cartons from the magazine 58 into the container.

The height of an empty container and the height of a tier of cartons, indicated at 100 in FIG. 7, varies with the size of the packages of cigarettes in the cartons. Therefore, it is desirable to be able to sequentially fill containers of varying sizes with tiers of cartons of varying sizes. To this end, the magazine walls 96 and 98 are expandable upwardly to accommodate tiers of cartons of different sizes. The walls 96 and 98 of the magazine 58 include a pair of opposite inner guide walls or panels 104 and 106 which are fixedly connected at one end to frame members 107 and a pair of opposite outer walls or panels 108 and 110 (see FIGS. 6 and 9). The movable outer panels 108 and 110 are slidably and pivotally connected to mounting rods 111 for both vertical movement and pivoting movement. A spring 112 (see FIG. 17) urges the movable panels 108 and 110 inwardly toward each other. The movable panels 108 and 110 include a transversely extending upper wall section, indicated at 113 in FIG. 7, which form a movable upper end wall or ceiling for the magazine 58. An empty container engaging sensor switch assembly 114 is mounted on the sections 113 of the movable panels 108 and 110. The sensor switch assembly 114 includes a pivotable actuator lever or treadle 116 which is loosely held by brackets 117 to enable the side panels 108 and 110 to be moved apart against the action of the spring 112.

As the magazine 58 is filled with tiers of cartons, the movable side panels 108 and 110 are raised to move the actuator lever 116 of the sensor switch assembly 114 into engagement with an inner upper surface 118 (see FIG. 8) of the empty container 86 on the loading platform 88. Continued upward movement of the side panels 108 and 110 rocks or pivots the lever 116 to actuate the sensor switch assembly 114 and to thereby detect that the accumulated tiers of cartons in the magazine 58 are sufficient to fill the container 86. The upper panels 113 also engage the surface 118 of the container 86 to guide the tier of cartons when they are inserted into the container. Thus, the sensor switch assembly 114 and the expanding walls 96 and 98 enable the magazine 58 to be used with containers 86 of various sizes for holding cartons of different sizes, such as cartons of "regular," "king-size," and "imperial" length cigarettes. Although in the present example it is contemplated that a constant number (five) of tiers of cartons will be packed into the empty containers, the sensor switch assembly 114 sensibly engages an empty container on the loading platform 88 when a sufficient number of cartons have been accumulated in the magazine 58 to fill the container regardless of the number of tiers of cartons to be packed into the container. Therefore, the magazine 58 can be used without adjustment to accumulate varying numbers of tiers of cartons for packing into containers of different sizes.

After a quantity of cartons sufficient to fill the container 86 have been accumulated, by raising and lowering the elevator 60 to sequentially lift groups of cartons into the magazine 58, the loader assembly 62 is operated to push the cartons from the magazine 58 into the container 86, as shown in FIG. 9. It should be noted that as the loader assembly 62 moves the cartons into the container 86, the container is clamped between the container positioning assembly 94 and the loader assembly 62 to hold the container against movement relative to the magazine 58. The loader assembly 62 then presses the container against the positioning assembly 94 and moves the container away from the magazine 58, that is toward the right as viewed in FIG. 9. This movement aligns the now filled or packed container 86 with an exit opening 120 in a lower portion of the tower 54. The exit opening 120 is normally blocked by a gate or closure assembly 122 which includes a pair of pivotally mounted panels 124 and 126 (see FIG. 6). However, after the carton 86 is moved into alignment with the exit opening 120, the panels 124 and 126 are moved from a blocking or closing position, shown in solid lines in FIG. 6, to an open position, shown in dashed lines in FIG. 6 and solid lines in FIG. 9. The container 86 is released by a contemporaneous retraction of the loader assembly 62 and the positioning assembly 94. The filled or packed container is then pushed off the loading platform 88, by an ejector assembly 130, onto an exit or outfeed conveyor 132 (see FIGS. 2 and 6). The ejector assembly 130 then lowers a next succeeding empty container onto the loading platform 88.

In view of the foregoing remarks, it can be seen that the processing equipment of FIGS. 1 and 2 includes a station where containers of cartons are unpacked. The cartons are opened and tax stamps or transfers are applied to packages of cigarettes within the cartons by the transfer applying apparatus 40. The cartons are then formed into laterally extending groups with longitudinal axes of the cartons in each group extending generally parallel to each other. The successive groups of cartons are transported to the elevator 60 which raises each group of cartons in turn into the magazine 58 wherein each group forms a layer or tier of six cartons.

As the layers or tiers of cartons are accumulated in the magazine 58, the movable side panels 108 and 110 of the magazine and the sensor switch assembly 114 are raised. When the number of cartons in the magazine 58 is sufficient to fill the container 86 on the loading platform 88, the actuator lever 116 is pivoted by engagement with the container 86 to actuate the sensor switch assembly 114. Upon actuation of the sensor switch assembly 114, the loader assembly 62 is operated to move the tiers of cartons from the magazine 58 into the container 86 while the container is held against movement by the container positioning assembly 94. The container 86 is then moved off the loading platform 88 onto the conveyor 132 by the ejector assembly 130.

CONTAINER SUPPLY APPARATUS

The container conveyor 48 transports empty containers from the unloading table 32 to the tower 54. A junction or intersection of the container conveyor 48 and the tower 54 is shown in FIG. 10. The container conveyor 48 includes a plurality of drive belts 136 which engage a longitudinally extending side surface of the containers to frictionally grip and move the containers along the conveyor 48. When the empty containers reach the end of the conveyor 48, the belts 136 continue the forward movement of the containers into an open upper end portion 138 of the tower 54, as illustrated in dashed lines by the container 86 in FIG. 10. Once the container 86 has moved into the open end portion 138 of the tower 54, the container begins to tilt or rotate under the influence of gravity until a leading corner or edge, indicated at 140, engages a downwardly extending pair of belts 142 which move the container down into the tower 54.

The belts 142 extend around an idler pulley 144 at the top of the tower 54 and engage a drive pulley 146 at an intermediate section of the tower. A drive belt 150 is connected to a drive pulley 152 of the conveyor 48 and is twisted for half a turn to rotate the drive pulley 146 and the belts 142 in a counterclockwise direction, that is in the direction of the arrows in FIG. 10. This rotation of the pulley 146 moves inner portions of the belts 142 downwardly in the tower 54. When the leading edge or corner 140 of the container 86 engages the downwardly moving inner portions of the belts 142, the pivoting or tilting movement of the container is continued by the belts to move the container through the positions indicated in dashed lines in FIG. 10. The container then descends in the tower 54, due to the influence of gravity and the moving belts 142, and is evntually positioned on the loading platform 88 in an orientation similar to the one illustrated in FIGS. 5, 11, and 11A. The closed gates 124 and 126 serve to guide the container as the container approaches the loading platform. As was previously mentioned, the containers are originally placed on the conveyor 48 with an open end of each container facing into the drawing as seen in FIGS. 1 and 10. This original positioning of the container 86 results in the open end of the container facing toward the magazine 58 (see FIG. 5) when the container 86 is on the loading platform 88.

The drive belts 142 substantially reduce the possibility of a container jamming or hanging up in the upper portion of the positioning tower 54. However, a door 154 in the tower 54 provides access to an interior portion of the tower to enable an operator to release any containers which do get caught or hung up in the tower 54. The access door 154 is mounted on a hinge 156 for outward pivoting movement to provide this access to the interior of the tower 54. A combination door handle and latch assembly 158 holds the door 154 closed during normal operations of the packer assembly. However, if and when a carton becomes hung up or caught in the tower 54, the handle 158 can be operated to open the door. The hung up or caught container can then be loosened or released to continue its descent to the loading platform 88.

Figure 11A:
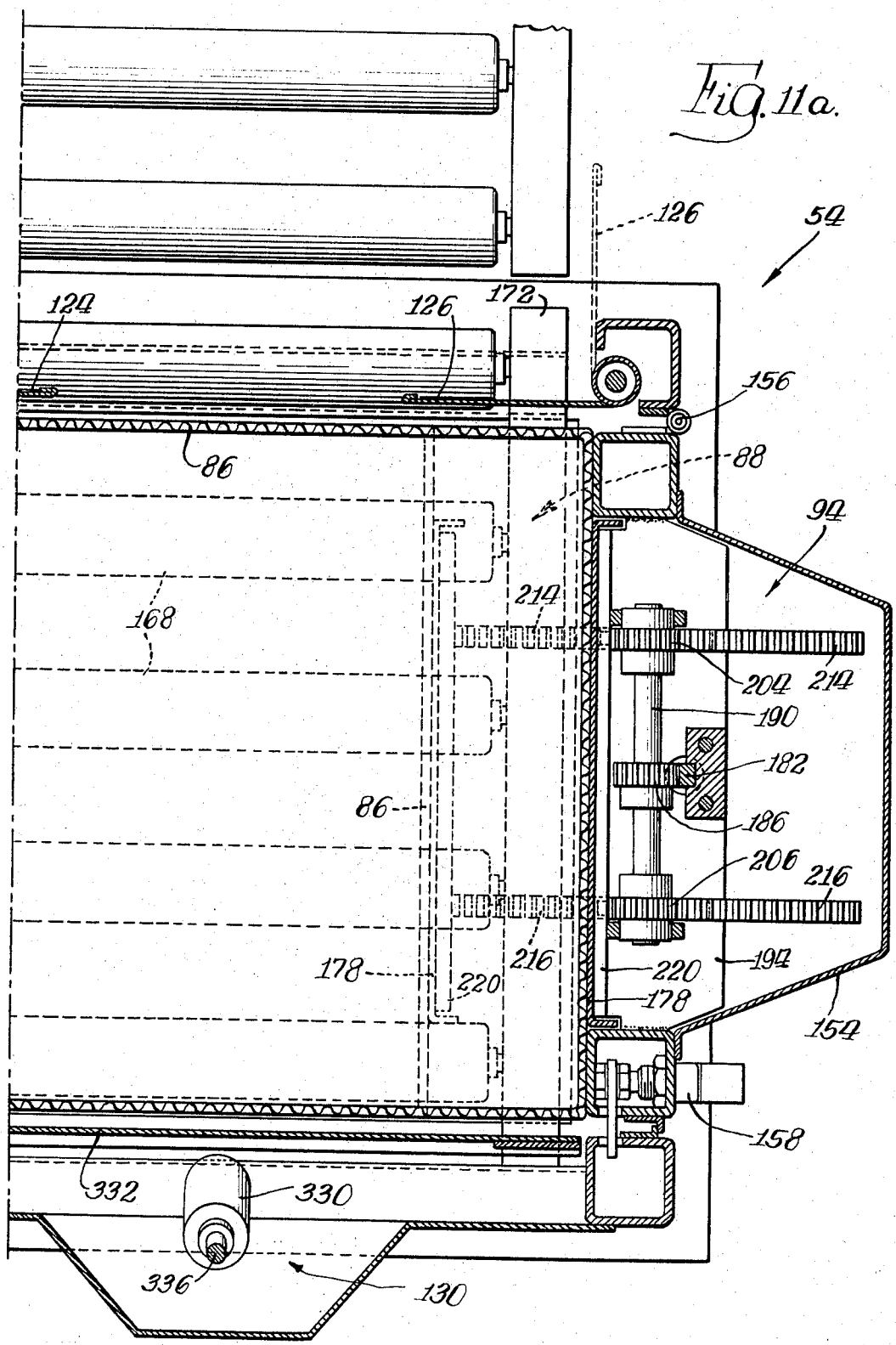
FIG. 11A is a continuation of FIG. 11 and illustrates the positioning of an empty container on the loading platform.

Assuming that there are no other containers in the tower 54 or on the loading platform 88, after the container 86 has completed its descent through the tower 54, the container comes to rest on the loading platform 88 in the initial position shown in FIGS. 5 and 11a. The weight of the container on the loading platform 88 operates a container sensor or detecting assembly 162 which is best seen in FIGS. 12 and 13. The container sensor assembly 162 includes a switch 164 which is actuated by a lowering or depressing of a resilient leaf spring 166. The leaf spring 166 is depressed or moved downwardly by the weight of a container 86 on a roller 168 of the loading platform 88. The roller 168 (see FIG. 13 on sheet 6 of the drawings) includes a central shaft 170 which extends outwardly to engage the leaf spring 166. The leaf spring 166 normally urges the roller 168 upwardly with the roller shaft 170 engaging a frame member or channel 172 of the loading platform 88. When a container is positioned on the loading platform 88, the weight of the container pivots the roller 168 about an end portion 176 to depress the spring 166 from the normal position shown in FIG. 13 to an operated position shown in dashed lines in FIG. 12. When the spring 166 is depressed, the normally open switch 164 is closed. It should be noted that the spring 166 urges the roller 168 upwardly toward the normal position and resiliently opposes the downward movement of the roller when a container is dropped onto the loading platform. This resilient action of the spring 166 reduces the shock loading on the switch 164.

CONTAINER POSITIONING ASSEMBLY

Actuation of the container sensor assembly 162, by the positioning of a container on the loading platform 88, completes control circuitry to operate the container positioning assembly 94 which is illustrated in FIGS. 10, 11a, 12 and 14. Operation of the container positioning assembly 94 moves a clamp plate or panel 178 from a retracted position, shown in solid lines in FIG. 11a, to a clamping position, shown in dashed lines in FIG. 11a. This movement of the clamp plate 178 shoves the empty container 86 from the initial position, shown in solid lines in FIG. 11a, to the loading position, shown in dashed lines in FIG. 11a and in solid lines in FIG. 6.

In the present embodiment of the invention, the container positioning assembly 94 includes a drive cylinder 180 (see FIGS. 12 and 14) having a piston which is connected to an upright main drive rack 182. Operation of the drive cylinder 180 reciprocates the main drive rack 182 to rotate drive pinion gears 184 and 186 which are centrally mounted on a pair of cross shafts 188 and 190. The cross shafts 188 and 190 are rotatably mounted on frame members 192 and 194 which are fixedly connected to the frame of the door 154. Driven pinion gears 200, 202, 204 and 206 are rotated with the shafts 188 and 190 upon which they are fixedly mounted. Rotation of the gears 200 through 206 moves a plurality of horizontally disposed racks 210, 212, 214 and 216 which are supported on rollers 217 and are connected at their innermost ends to the clamp plate 178 by mounting frames 218 and 220.

In view of the foregoing remarks, it will be understood, that when the drive cylinder 180 is operated to move the main drive rack 182 downwardly, from the position shown in FIGS. 12 and 14, the drive gears 184 and 186 are rotated. Rotation of the drive gears 184 and 186 rotates the driven gears 200 through 206 to drive the racks 210 through 216 to move the clamp plate 178 outwardly from the retracted or normal position, shown in solid lines in FIG. 11A, to a clamping or holding position, shown in dashed lines in FIG. 11A. This movement of the clamp plate 178 moves the container 86 on the platform 88 from the initial position, shown in solid lines in FIG. 11A, to the loading position, shown in FIG. 6 and in dashed lines in FIGS. 11 and 11A. The sidewalls of container 86 are then located in an overlapping relationship with the side walls 96 and 98 of the magazine 58. When necessary, the positioning assembly 94 can be readily repaired or maintained by merely removing a panel of the door 154 to expose the positioning assembly 94, as seen for example in FIG. 10.

MAGAZINE LOADING

The magazine 58 is loaded with a plurality of tiers or layers of cartons by the elevator 60. The elevator 60 lifts the cartons, a group at a time, upwardly into the magazine where each group of cartons forms a tier or layer. The elevator 60 includes three support rollers 230, 232 and 234 which have longitudinal axes extending parallel to the longitudinal axes of the rollers 72 of the conveyor 44 and are rotatably mounted on an elevator carriage 236 (see FIGS. 7 and 11). It should be noted that the axes of the rollers on the loading platform 88 extend perpendicularly to the axes of the rollers 72, and 230 through 234 to facilitate moving the packed containers out of the tower 54. The elevator rollers 230 through 234 engage a longitudinally extending drive belt 240 when the elevator is in the lowered or down position of FIG. 7. The drive belt 240 is rotated by the conveyor motor 82 (see FIG. 3) to rotate the rollers 72 of the carton conveyor 44 and the rollers 230 through 234 of the elevator 60. Thus, the groups of cartons are moved along the conveyor 44 by the rotation of the rollers 72. When a group of cartons reaches the end of the conveyor 44, they are moved into engagement with the rollers 230 through 234 of the elevator 60.

The rotation of the rollers 230 through 234 moves the groups of cartons sequentially onto the elevator 60. As the cartons move onto the elevator 60, a plurality of normally open interlock switches 244 (see FIGS. 7, 15 and 17) are actuated, one switch being actuated by each carton to indicate the presence of a complete group of cartons on the elevator. Immediately after actuating the switches 244, a leading end of the cartons engage a stop plate 245 through which actuating levers for the switches 244 project. The stop plate 245 positions the cartons for movement into the magazine 58 and protects the switches 244 against impacts from the cartons.

The elevator is moved from the lowered position to the raised position by a drive cylinder 246 which is connected to the elevator carriage 236. A pair of guide rods or bars 247 are also connected to the carriage 236 and to a movable base plate 248. Before the elevator is moved upwardly to the raised position, a pair of holding bars or plates 250 and 252 are moved from a closed or holding position, shown in dashed lines in FIG. 15, to an open position, shown in solid lines in FIG. 15, by operation of a pair of hold bar drive cylinders 256 and 258 which are best seen in FIG. 11. The holding bars support the tiers of cartons in the magazine 58 by engaging the ends of the lowermost tier of cartons in the magazine. The drive cylinders 256 and 258 are normally retained in a closed position by springs within the cylinders. When the cylinders are operated in response to closing of the switches 244, the holding bars 250 and 252 are moved from the closed position, indicated in dashed lines in FIGS. 11 and 15 to the open position shown in solid lines in FIGS. 11 and 15. The hold bar positioning cylinders 256 and 258 can be moved to the open position only when all of the interlock switches 244 have been closed by engagement with cartons on the elevator 60. It should be noted that the provision of six interlock switches 262 insures that six cartons, that is an entire group or tier of cartons, are located on the elevator 60 before the holding bar positioning cylinders 256 and 258 are operated from the closed position to the open position. As previously mentioned, this insures that an incomplete group of cartons cannot be raised into the magazine.

As the holding bar positioning cylinders 256 and 258 are moved to the open position, the holding bars 250 and 252 are moved out of supporting engagement with the tiers 100 of cartons in the magazine 58. During this movement one of the holding bars actuates a switch to complete a control circuit for operating the elevator 60 to raise the elevator. However, before the elevator 60 can begin its upward movement the holding bars 250 and 252 release the tiers of cartons in the magazine 58 for downward movement onto a group or tier of cartons on the elevator 60. Immediately after the holding bars 250 and 252 are moved to the open position and the tiers of cartons in magazine 58 have descended onto the group of cartons on the elevator 60, the elevator 60 is moved to the raised or solid line position of FIG. 15 by the drive cylinder 246. As the elevator is raised the rollers 230 through 234 are moved out of engagement with the drive belt 240 and stop rotating about their longitudinal axes. While the elevator 60 is in the raised position shown in FIG. 15, a stop plate 266, which is connected to the elevator carriage 236 and extends transversely across the path of movement of cartons on the conveyor rollers 72, is positioned in a blocking relationship with a next succeeding or incoming group of cartons, indicated at 268 in FIG. 15. The stop plate 266 holds the next succeeding group of cartons against further movement until the elevator 60 and the stop plate are lowered.

When the elevator 60 reaches the end of its upward stroke, that is when the elevator is in the raised position of FIG. 15, an elevator limit switch is actuated and the holding bars 250 and 252 are moved to the closed position, indicated in dashed lines in FIG. 15. Assuming that additional tiers of cartons are required to fill the container 86, the elevator 60 then descends from the raised position, shown in dashed lines in FIG. 15. The tiers 100 of cartons are then supported by the holding bars 250 and 252 which were previously moved back to the holding position.

It should be noted that the holding bar 252 includes a plurality of transversely extending teeth or fingers, some of which have been designated 274 in FIG. 11. A support plate or comb 276 is mounted on the elevator carriage 236 and includes a plurality of transversely extending teeth or fingers, some of which have been indicated at 278 in FIG. 11. The teeth 278 of the plate 276 support the forward end portions of the cartons which are located on the elevator 60 and facilitate a smooth and unobstructed transfer of the cartons from the magazine 58 to an empty container on the loading platform. When the elevator 60 is lowered, the teeth 278 of the plate 276 pass between the teeth 274 of the holding bar 252. The end portions of the cartons which were previously supported by the teeth 278 of the plate 276 are then engaged and supported by the teeth 274 of the holding bar 252.

As the tiers of cartons are accumulated in the magazine 58, the upper tier of cartons approaches the upper sections 113 of the movable outer panels 108 and 110 of the magazine. When the upper tier of cartons engages or is immediately adjacent to the upper sections 113, the movable outer panels 108 and 110 are lifted or raised by the placement of the next tier of cartons in the magazine 58. In the present embodiment of the invention, when four tiers of cartons have been accumulated in the magazine 58 the movable walls 108 and 110 are in a lowered or retracted position shown in FIG. 7. When the fifth tier of cartons is lifted into the magazine 58 by the elevator 60 (see FIGS. 15 and 17), the outer movable panels 108 and 110 are raised or extended relative to the fixed inner panels 104 and 106. This upward movement of the outer panels 108 and 110 moves the sensor switch assembly 114 upwardly to engage the container 86 on the loading platform 88 and actuates the sensor switch assembly 114. This actuation of the sensor switch assembly 114 indicates that a sufficient number of cartons (thirty) have been accumulated in the magazine 58 to fill the container 86 (see FIGS. 7 and 8). A control circuit is completed by actuation of the sensor switch assembly 114 to operate the loader assembly 62 to push the tiers of cartons from the magazine 58 into the container 86 (see FIG. 9).

LOADER ASSEMBLY

The loader assembly 62 (see FIG. 5) pushes the tiers of cartons from the magazine 58 into a container 86 on the loading platform 88 to fill or pack the container. The loader assembly 62 includes a double acting main or central drive cylinder 290 which is connected to a head section 292. When the drive cylinder 290 is operated, the head section 292 is moved into the magazine 58, that is the head section is moved from the retracted or initial position shown in FIG. 5 to an extended or loading position shown in FIG. 9. This movement of the head section 292 shoves or pushes the tiers of cartons into the container 86 to fill or pack the container. The head section 292 is then moved back to the retracted position, as shown in FIG. 5, by the double acting cylinder 290. A pair of guide shafts 294 and 296 are connected to the head section 292 and supported by bearing 298 to guide the movement of the head section 292 between the retracted and extended positions.

The head section 292 is extendible upwardly from an initial position, shown in FIG. 7, to the position shown in FIG. 15 to enable the head section 292 to be used to move tiers of cartons of various heights into a container 86 on the loading platform 88. To this end, the head section 292 includes a fixed plate or panel 300 and a movable plate or panel 302 (see FIG. 15) which is connected to a head section adjusting cylinder 304. The cylinder 304 is connected by a frame 306 to the fixed plate 300, and a piston 308 is connected by a bracket 310 to the movable plate 302. Thus, when the piston 308 is extended from the cylinder 304, the movable plate 302 is lifted relative to the fixed plate 300 to extend the head section 292 upwardly.

As is perhaps best seen in FIG. 17, a pair of rollers or wheels 314 and 316 are rotatably mounted on the movable plate 302 for engagement with the upper sections 113 of the movable side panels 108 and 110 of the magazine 58. Sufficient fluid pressure is maintained in the cylinder 304 to move the panel 302 upwardly to maintain a continuous engagement between the rollers 314 and 316 and the upper sections 113 of the movable side panels 108 and 110 as the side panels are raised by the accumulation of tiers of cartons in the magazine 58. It should be noted that while pneumatic pressure in the cylinder 304 is sufficient to raise the movable panel 302 upwardly, the pneumatic pressure is insufficient to raise the movable panels 108 and 110. Thus, the head section 292 is expanded automatically to correspond to the vertical height of the tiers of cartons in the magazine 58 as the side walls of the magazine 58 are expanded by the accumulation of tiers of cartons.

After a quantity of cartons sufficient to fill the container 86 have been accumulated in the magazine 58 and the sensor switch unit 114 has been actuated, the head section 292 is moved from the retracted position of FIG. 6 to the extended position of FIG. 9 to push the tiers of cartons from the magazine 58 into the container 86. During this movement from the retracted position to the extended position, the tiers of cartons are pushed outwardly through the funnel shaped mouth or open end 90 of the magazine. As the cartons are first moved toward the open end 90 of the magazine 58, they press or cam the side walls 96 and 98 of the magazine outwardly relative to each other from the position shown in FIG. 6 to the position shown in FIG. 9 by engagement with inwardly converging sections 320 of the sidewalls 96 and 98. During this outward movement the movable side panels 108 and 110 are moved against the action of the spring 112 while the fixed side panels 104 and 106 are resiliently flexed outwardly. As the side walls 96 and 98 of the magazine 58 are moved outwardly, end sections 322 and 324 of the side walls are moved outwardly into clamping engagement with inner vertically extending surfaces 326 and 328 of the container 86. This clamping engagement insures that the tiers of cartons can be moved from the magazine 58 into the container 86 without catching on the side walls of the container 86. Thus, the walls 96 and 98 of the magazine 58 are expandable upwardly to enable the magazine to accommodate tiers of cartons of varying sizes, and the walls 96 and 98 are also expandable outwardly or laterally to provide an overlapping clamping engagement with the side walls of the container 86. It should be noted that the outward expandability of the side walls 96 and 98 also enables the magazine 58 to be used with cartons having slightly different widths to fill containers of slightly different widths.

The plate or panel 178 of the positioning assembly 94 has previously been extended outwardly by the drive cylinder 180 (see FIGS. 11A and 14) to hold the container 86 in the aforementioned overlapping relationship with the side walls 96 and 98 of the magazine 58 while the cartons are pushed into the container. As the head section 292 of the loader assembly 62 pushes the cartons into engagement with the opposed vertical wall or bottom of the container 86, the drive cylinder 290 applies a force against the cartons, the container 86, and the plate or panel 178. This force is sufficient to overcome an opposing force applied by the cylinder 180 and the plate 178 to the container 86, so that the loaded container 86 is moved gradually from the position shown in FIG. 6 to a discharge position shown in FIG. 9. This movement locates the container 86 in alignment with the exit opening 120 and the container output conveyor 132 (see FIG. 6).

After the container 86 has been filled or packed and moved to the discharge position shown in FIG. 9, the pneumatic pressure in both the cylinder 180 of the positioning assembly 94 and the cylinder 290 of the loading assembly 62 are contemporaneously released. Therefore, the head section 292 of the loader assembly 62 is retracted contemporaneously with a retraction of the plate 178 of the positioning assembly 94. As the head section 292 is being retracted, the cylinder 304 on the head section is exhausted to the atmosphere so that the piston 308 and the movable plate 302 are moved from the extended position, shown in FIG. 15, to the retracted position, shown in FIG. 7, by the weight of the movable side panels 108 and 110 of the magazine 58. The cylinder 304 acts as a damper and retards the movement of the side panels 108 and 110 of the magazine 58 from the raised position of FIG. 15 to the initial or lowered position of FIG. 7.

EJECTOR ASSEMBLY

The ejector assembly 130, see FIG. 12, operates to move the now packed or filled container 86 off the loading platform 88 and to lower a next succeeding empty container gently onto the loading platform to protect the sensor switch 164. The ejector assembly 130 accomplishes these functions with a drive cylinder 330 which is connected to an ejector plate or panel 332 by a crank arm or lever 334. The lever 334 is pivotally connected to a piston shaft 336 of the cylinder 330. The ejector plate 332 is pivotally mounted on a transversely extending frame member 340 for movement from an initial vertical position, shown in solid lines in FIG. 12, to a raised horizontal position, shown in dashed lines in FIG. 12.

After the gate assembly 122 has been opened, the piston shaft 336 is retracted to move the ejector plate 332 rapidly and forcefully from the initial position to the raised position when a packed or filled carton is centered on the loading platform 88 in alignment with the exit opening 120 as shown in FIG. 9. Movement of the ejector plate 332 from the initial position to the raised position kicks or shoves the packed container 86 off the loading platform 88 and onto the container output conveyor 132 (see FIG. 2). The ejector plate 332, when in the raised position, is located immediately below and in supporting engagement with a next succeeding container in the stack of containers in the tower 54. It should be noted that the movement of the ejector plate 332 from the initial position to the raised position is fast enough so that the ejector plate engages the next succeeding container before the container has dropped onto the loading platform. The cylinder 330 is then exhausted to the atmosphere and the weight of the next succeeding container on the ejector plate 332 pivots the plate slowly back to the initial position, shown in solid lines in FIG. 12. This pivoting movement gently postions the next succeeding container on the loading platform 88 to reduce shock loading on the sensor switch 164. Thus, the ejector plate 332 is pivoted upwardly to shove or push a filled container 86 out of the tower 54 onto output conveyor 132. The ejector plate 332 is then pivoted downwardly to gently lower the next succeeding empty container slowly onto the loading platform 88 with an open end of the container in alignment with the magazine 54.

CONTROL APPARATUS

Figure 18:
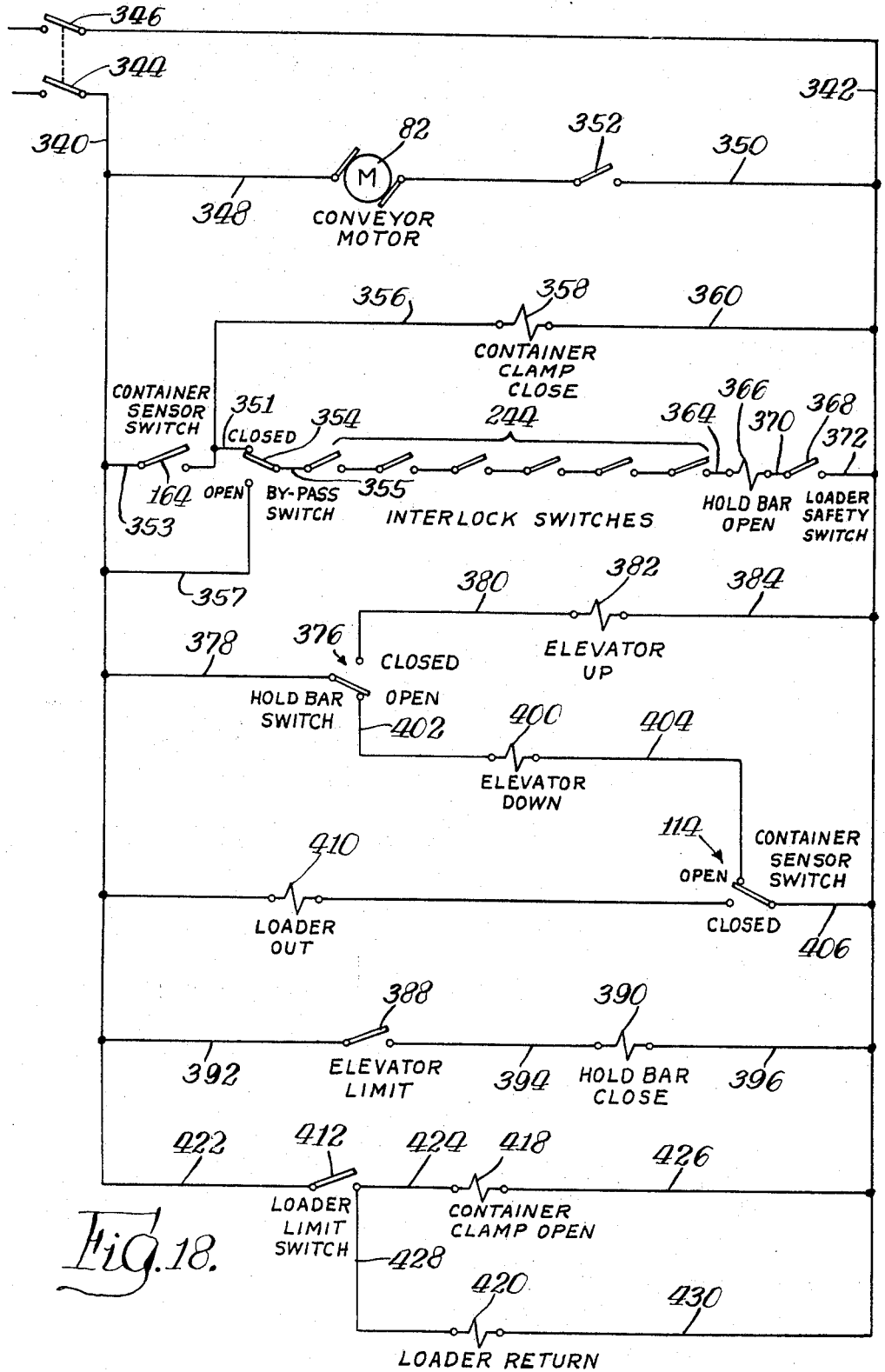
FIG. 18 is a schematic illustration of an electrical control circuit for the packer assembly.

An electrical control circuit for the packer is shown in FIG. 18. The electrical control circuit includes a pair of main power lines 340 and 342. The main power lines are connected to a source of power through a pair of "on-off" or main control switches 344 and 346. The motor 82 for driving the conveyor 44 is connected between the power lines 340 and 342 by leads 348 and 350 and a motor control switch 352. Thus, when the switches 344, 346 and 352 are closed, the motor 82 is energized to operate the conveyor 44 to transport groups of cartons. Contemporaneously with the energization of the conveyor motor 82, a motor in a circuit (not shown) for the transfer applying apparatus 40 is energized to operate the conveyor 48 and transport containers to the tower 54.

When a container is positioned on the loading platform 88, the container sensor switch 164 is closed by a downward movement of the roller 168 (see FIG. 12). The container sensor switch 164 is connected by a lead 353 to the power line 340 and is also connected by a lead 356 to a container clamp close solenoid 358 which is connected to the power line 342 by a lead 360. Energization of the container clamp close solenoid 358 actuates a pneumatic valve means to conduct air under pressure to the drive cylinder 180 of the conveyor positioning or clamp assembly 94 (see FIG. 12 and 14). Operation of the container positioning or clamp cylinder 180 moves the positioning or clamp plate 178 from an initial or retracted position, shown in FIG. 5, to an extended position, shown in FIG. 6. This movement positions the container 86 in an overlapping relationship with the walls 96 and 98 of a magazine 58.

Meanwhile, the operation of the conveyor 44 is moving groups of cartons onto the elevator 60 (see FIG. 7). When a group of cartons is positioned on the elevator 60 the interlock switches 244 are closed, one of the six switches 244 being closed by each carton of the group of cartons (see FIGS. 15 and 17 taken in connection with FIG. 18). The carton interlock switches 244 are connected to the power line 340 through the lead 353, the switch 164, the lead 356, a lead 351, a normally open by-pass switch 354, and a lead 355. As hereinafter described, the by-pass switch 354 (FIG. 12) is held in closed position when the ejector plate 332 is in its lowered position. The carton interlock switches 244 are also connected by a lead 364 to a hold bar open solenoid 366 which is in turn connected to a loader safety switch 368 and the power line 342 by leads 370 and 372. The loader safety switch 368 is mounted adjacent to the guide bars 296 of the loader assembly 62 (see FIG. 5) and is actuated by a cam 374 on the guide shaft 296 when the head section 292 of the loader assembly is in the retracted or initial position of FIG. 5. Thus, the loader safety 368 insures that the hold bar open solenoid 366 is energized only when the head section 292 is in the retracted position of FIG. 5. Since the elevator 60 cannot be raised until the hold bar open solenoid 366 is energized to move the holding bars 250 and 252 to the open position, the loader safety switch 368 insures that the elevator 60 is not raised until the head section 292 of the loader assembly 62 is in the retracted position of FIG. 5 and out of the way of the elevator 60. Of course, in addition to the loader safety switch 368, the interlock switches 244 must be closed by cartons on the elevator 60 and, assuming that the by-pass switch 354 is in closed position, the container sensor switch 164 must be closed by a container on the loading platform 88 before the elevator can be raised. However, if the ejector plate 332 is in its raised position, the by-pass switch 354 is open and is connected through a lead 357 to the power line 340 thereby completing the circuit through the solenoid 366 even though the switch 164 is not closed.

When the loader safety switch 368 is closed, the interlock switches 244 are closed, and either the container sensor switch 164 is closed or the by-pass switch 354 is in open position, the hold bar open solenoid 366 is energized. Energization of the solenoid 366 actuates pneumatic valve means to connect air under pressure to the hold bar cylinders 256 and 258 and moves the holding bars 250 and 252 to the open position shown in solid lines in FIG. 11. Movement of the holding bars 250 and 252 to the open position closes a normally open hold bar switch 376 (see FIG. 3) to conduct electrical energy through the power line 340 and leads 378 and 380 to an elevator up solenoid 382. The circuit for energizing the elevator up solenoid 382 is completed by a lead 384 to the power line 342. Energization of the elevator up solenoid 382 actuates pneumatic valve means to connect a source of air under pressure to the cylinder 246 of the elevator 60. The elevator 60 then moves from the lowered position of FIG. 7 to the raised position of FIG. 15 to lift a group of cartons into the magazine 58.

Once the elevator has moved to the raised position of FIG. 15, an elevator limit switch 388 (see FIG. 7) is operated by a collar 389 on a guide rod 247 to energize a hold bar close solenoid 390 over a circuit including leads 392, 394 and 396. Energization of the hold bar closed solenoid 390 actuates pneumatic valve means to exhaust the hold bar cylinders 256 and 258 to the atmosphere. Return springs within the cylinders then move the holding bars 250 and 252 back to the closed position, indicated in dashed lines in FIG. 11. When the holding bars 250 and 252 are moved toward the closed position, the hold bar switch 376 is released for movement to its normal or open position.

Assuming that additional cartons must be accumulated within the magazine 58 to fill the container 86, an elevator down solenoid 400 is energized over a circuit including the hold bar switch 376 and the normally open container sensor switch 114 which are connected by leads 378, 402, 404 and 406 with the power lines 340 and 342. Energization of the elevator down solenoid 400 operates pneumatic valve means to exhaust the cylinder 246 to the atmosphere and a return spring within the cylinder then moves the elevator 60 to the lowered position of FIG. 7. Once the elevator 60 has been returned to the lowered position, a next subsequent group of cartons is moved onto the elevator to close the interlock switches 244. Closing the switches 244 completes the circuitry for again moving the holding bars 250 and 252 to the open position and energizing the elevator up solenoid 382 to raise the elevator 60 in the manner previously explained.

Assuming that this next group of cartons is sufficient to raise the movable side walls 108 and 110 of the magazine 58 and position to actuator lever 116 of the sensor switch assembly 114 in engagement with a container 86 on the loading platform 88 (see FIGS. 7 and 8), the sensor switch assembly 114 is moved to the closed position by engagement with the container 86 (see FIG. 18). Closing the sensor switch assembly 114 completes a circuit for energizing a loader out solenoid 410 and prevents the elevator down solenoid 400 from being energized to lower the elevator 60. Energizing the loader out solenoid 410 operates pneumatic valve means to conduct air under pressure to the drive cylinder 290 to extend the head section 292 of the loader assembly outwardly to the position shown in FIG. 9. This movement of the head section 292 pushes the tiers of cartons in the magazine 58 off the elevator 60 and into the container 86 on the loading platform 88.

When the head section 292 reaches the position shown in FIG. 9, a loader limit switch 412 (see FIGS. 5 and 9) is actuated by a cam 414 on the guide rod 296 to contemporaneously energize a container clamp open solenoid 418 and a loader return solenoid 420 over parallel circuits including leads 422 through 430. Energization of the clamp open solenoid 418 operates a pneumatic valve means to exhaust the cylinders 180 and 304 to the atmosphere. Exhausting the cylinder 180 to the atmosphere enables a return spring within the cylinder to move the clamp plate 178 from the extended position of FIG. 9 to the retracted or normal position of FIG. 5. Exhausting the cylinder 304 to the atmosphere enables the movable plate to move downwardly from the extended position of FIG. 17. The contemporaneous energization of the loader return solenoid 420 operates the cylinder 290 to move the head section 292 from the extended position of FIG. 9 to the retracted position of FIG. 5.

It should be noted that as the cartons are loaded into the container 86, the loader assembly 62 moves the container to the discharge position (see FIG. 9) and out of engagement with the sensor switch assembly 114 to enable the sensor switch assembly to return to the normal or open position. When the sensor switch assembly 114 moves to the normal position (shown in FIG. 18), the elevator down solenoid 400 is energized by a circuit including the now open hold bar switch 376 to lower the elevator 60. The filled container 86 is then ejected from the tower 54 by the ejector assembly 130 and a next succeeding container is lowered onto the loading platform 88.

The pneumatic control apparatus and associated electrical solenoids are illustrated schematically in FIG. 19. The pneumatic control apparatus is connected to a source of air under pressure, such as a compressor, by a main supply line or conduit 440. The main supply line or conduit 440 is connected to a three-way valve 442 and an air manifold 444 by lines or conduits 446 and 448. The three-way valve 442 is normally positioned to conduct air from the line 446 to the line 448 and the manifold 444. However, if a jam or back-up should occur in the packer assembly 56, a pressure release valve 450 can be actuated manually to conduct air under pressure from the main supply line 440 to an actuator 452 through lines or conduits 454 and 456 to operate the valve 442 and exhaust the manifold 440 to the atmosphere while blocking the flow of air through the conduit 446.

The drive cylinder 290 (see FIG. 5) of the loader assembly 62 is connected to a four-way valve 460 which is selectively operated by the loader return and loader out solenoids 420 and 410 to conduct air through line 462 and lines 464 or 466 to the cylinder 290. When the loader out solenoid 410 is energized, air is conducted through the line or conduit 466 to extend a piston in the cylinder 290 to move the head section 292 from the position shown in FIG. 5 to the position shown in FIG. 9. When the loader return solenoid 420 is energized, air is conducted under pressure through the line or conduit 464 to retract the piston, and the head section 292 of the loader assembly 62, from the position shown in FIG. 9 to the position shown in FIG. 5.

A line or conduit 470 extends from the manifold 444 to a three-way control valve 472. The valve 472 is selectively operated by the hold bar open solenoid 366 and the hold bar close solenoid 390 to extend and retract pistons of the hold bar cylinders 256 and 258. Thus, when the hold bar open solenoid 366 is energized, air is conducted through a line or conduit 476 to the hold bar cylinders 256 and 258 to extend the pistons and move the holding bars 250 and 252 from the closed position shown in dashed lines in FIG. 11 to the open position shown in solid lines in FIG. 11. Energization of the hold bar close solenoid 390 blocks a flow of air through the conduit 470 and exhausts the conduit 476 to the atmosphere so that return springs 478 and 480 in the cylinders 256 and 258 move the holding bars 250 and 252 from the open position to the closed position.

The manifold 444 is connected by a conduit 484 to a three-way valve 486 to control the operation of the elevator drive cylinder 246. The elevator drive cylinder 246 is connected by a line or conduit 490 to the three-way valve 486 so that when the elevator up solenoid 382 is energized, air is conducted under pressure through the lines or conduits 484 and 490 to the cylinder 246 to extend a piston and raise the elevator 60. On the other hand, when the elevator down solenoid 400 is energized the flow of air through the line or conduit 484 is blocked and the line or conduit 490 and the cylinder 246 are exhausted to the atmosphere to enable a return spring 492 to move the elevator to the retracted or lowered position.

A single three-way control valve 500 is used to control the opertaion of the container clamp cylinder 180 (see FIGS. 12 and 14) and the loader head section cylinder 304 (see FIGS. 15 and 17). The three-way valve 500 is connected by a line or conduit 502 to the manifold 444 and by a line or conduit 504 to a flow control assembly 505 and to the container clamp cylinder 180. The three-way valve 500 is also connected by a line or conduit 506 to a pressure regulator 508 which is in turn connected by a line 510 to a flow control assembly 511 and to the loader head section cylinder 304. When the container clamp close solenoid 358 is energized, air is conducted under pressure to the container clamp cylinder 180 to move the plate 178 from the initial or retracted position of FIG. 5 to the extended position of FIG. 6. The operation of the container clamp close solenoid 358 also enables air to flow through the conduit 506 to the pressure regulator 508 and to the loader head section cylinder 304 through the conduit 510. The pressure regulator 508 reduces the pressure to the cylinder 304, e.g. to 15 pounds/sq. in., to insure that the movable plate 302 of the head section 292 is urged upward with a force which is insufficient to rasie the movable side panels 108 and 110 of the magazine 58 (see FIG. 17). Operation of the container clamp open solenoid 418 exhausts the three-way valve 500 to the atmosphere to enable a return spring in the clamp cylinder 180 to move the clamp plate 178 from the extended position to the retracted position and enables the movable plate 302 of the head section 292 to be retracted by moving the piston downwardly in the cylinder 304.

The operation of the ejector cylinder 330 (see FIG. 12) and a gate cylinder 520 (see FIG. 14) are controlled by a three-way valve 524 mounted adjacent to the guide rod 294 of the loader assembly 62, shown in FIGS. 5, 6 and 9. The valve 524 is a three-way valve so that a valve is positioned to conduct air from the manifold 444 through a line or conduit 528 to a line or conduit 530 on every third actuation of the valve 524. When the valve 524 is actuated for a third time, to enable air to flow from the manifold 444 through the conduit 528 into the conduit 530, the ejector cylinder 330 is operated by air conducted through a flow control assembly 532 and a line or conduit 534 to the cylinder 330 to pivot the plate 332 from the initial or normal position shown in solid lines in FIG. 12 to the raised position shown in dashed lines in FIG. 12. In addition, the gate cylinder 520 is normally supplied with air from the manifold 444 through a line 544, a three-way valve 540, and a line 546 to hold the gates 124 and 126 in closed position, but when the valve 524 is actuated for the third time, air is also supplied from the conduit 530 to an actuator 542 to operate the valve 540 and exhaust the line 546 and the gate cylinder 520 to the atmosphere. A piston in the gate cylinder 520 is then retracted by a return spring to move the gates 124 and 126 from the closed position shown in solid lines in FIG. 6 to the open position shown in dashed lines in FIG. 6. It should be noted that the use of the three-way valve 540 enables the gate cylinder 520 to be exhausted to the atmosphere to move the gates to the open position under the influence of the return spring immediately after the three-way valve 524 is operated. The ejector cylinder 330, on the other hand, is connected to the line 530 through the flow control assembly 532 so that the operation of the ejector cylinder 330 lags or occurs slightly after the opening of the gates 124 and 126. In addition, the use of separate lines to supply air to the gate cylinder 520 and to the ejector cylinder 330 insures that there is a sufficient volume of air conducted to both cylinders to operate them in a sharp positive manner.

METHOD OF OPERATION

The first step in the operation of the apparatus includes opening containers of cartons of cigarettes. Control switches and valves, not shown, are then actuated to energize electrical and pneumatic circuitry for operating the transfer applying apparatus 40 and the conveyor 34 to conduct cartons to and through the transfer applying apparatus. In addition, the switches 344, 346 and 352 are closed to energize the packer control circuitry and conveyor drive motor 82. The container conveyor 48 is operated, by power transmitted from the conveyor 34 by a drive shaft in a hollow casing 550 (see FIG. 1), to transport containers to the tower 54. The containers are positioned on the conveyor 48 with open ends of the containers facing into the drawing as viewed in FIG. 1 or toward the transfer applying apparatus 40 as viewed in FIG. 2. The empty containers 86 enter an open end portion 138 of the tower 56, as shown in FIG. 10. The containers are then pivoted or rotated through an arc of slightly over 90° and are engaged by a pair of belts 142 to insure that the containers descend downwardly through the tower 54 toward the loading platform 88. When the first empty container 86 is dropped onto the loading platform 88, a container sensor switch 164 (see FIGS. 12 and 18) is actuated.

Actuation of the switch 164 completes the circuit for energizing the container clamp close solenoid 358. The valve 500 is operated by the energization of the solenoid 358 to connect air under pressure to the container clamp cylinder 180 (see FIGS. 12, 14 and 19). The drive rack 182 is then moved downwardly to rotate the pinion gears 200 through 206 and move the clamp plate 178 from the retracted position to the clamping position. This movement of the clamp plate 178 pushes the empty container into the loading position so that the container is in an overlapping relationship with the sidewalls 96 and 98 of the magazine 58 (see FIG. 6). Operation of the valve 500 also connects air under pressure to the cylinder 304 in the head section 292. The cylinder 304 will then raise the movable panel 302 of the head section as the movable side panels 108 and 110 of the magazine 58 are raised.

While the empty container 86 was being transported to the loading platform 88, groups of cartons of cigarettes were moved through the transfer applying apparatus 40 where the cartons were opened, transfers applied to packages of cigarettes within the cartons, and the cartons closed. After the cartons have been closed, they are assembled into groups of six and transported by a group conveyor 42 to the packer supply or carton conveyor 44. The longitudinally extending drive belt 240 of the conveyor 44 is driven by the motor 82 (see FIGS. 3 and 18) to rotate the rollers 72 and transport groups of cartons to the elevator 60. When the first group of cartons is moved onto the elevator 60, the interlock switches 244 (see FIGS. 7, 11, 17 and 18) are actuated by the cartons.

Assuming that the loader assembly 62 is in the retracted position of FIG. 5 so that the loader safety switch 368 is closed and assuming also that the container sensor switch 164 is closed by a container in loading position on the platform 88 (or the switch 354 is open so as to bypass the switch 164), the hold bar open solenoid 366 will be energized when the interlock switches 244 are closed. Energization of the hold bar open solenoid 366 operates the three-way control valve 472 (see FIG. 19) to conduct air under pressuer to the hold bar cylinders 256 and 258. This moves the holding bars 250 and 252 from the closed position, indicated in dashed lines in FIG. 6, to the open position, indicated in solid lines in FIG. 6. When the holding bars 250 and 252 are in the open position, the hold bar switch 376 (see FIGS. 3 and 18) is actuated to energize the elevator up solenoid 382. Energization of the elevator up solenoid 382 operates the control valve 486 (see FIG. 19) to conduct air under pressure to the cylinder 246 and raises the elevator 60 from the lowered position of FIG. 7 to the raised position of FIG. 15. As the elevator moves upwardly, the stop plate 266 (see FIG. 15) is moved into position to block a succeeding or next incoming group of cartons, indicated at 268. When the elevator 60 completes its upward movement, the elevator limit switch 388 is moved to the closed position to energize the hold bar close solenoid 390. Energization of the hold bar close solenoid 390 operates the valve 472 to exhaust the hold bar cylinders 256 and 258 to the atmosphere. The holding bars 250 and 252 are then returned to the closed position under the urging of springs 478 and 480 in the cylinders 256 and 258 respectively. When the holding bars 250 and 252 have moved to the closed position, the switch 376 (see FIGS. 3 and 18) is closed to energize the elevator down solenoid 400. Energization of the elevator down solenoid 400 operates the valve 486 to exhaust the elevator cylinder 246. The elevator 60 then descends from the raised position of FIG. 15 to the lowered position of FIG. 7 to receive the next succeeding group of cartons.

The elevator 60 is repeatedly operated in the manner previously explained to raise groups or tiers of cartons into the magazine 58. After a plurality of tiers of cartons have been accumulated in the magazine, the cartons will engage the upper sections 113 of the movable panels 108 and 110 to raise the panels and extend the magazine upwardly. Contemporaneously with this upward movement of the panels 108 and 110, the cylinder 304 on the head section 292 is extended by air under pressure, conducted through the valve 500, to raise the movable plate 302 of the head section 292. Thus, the head section 292 of the loader assembly 62 is extended upwardly as the magazine 58 is expanded upwardly.

When a final tier of cartons is moved into the magazine 58 so that sufficient cartons have been accumulated to fill the container 86 on the loading platform 88, the lever 116 of the sensor assembly 114 is moved into engagement with an inner surface 118 of the container 86 to actuate the sensor switch assembly 114 (see FIGS. 7 and 8). Movement of the sensor switch 114 to closed position energizes the solenoid 410 to operate the valve 460 (see FIGS. 18 and 19) to conduct air under presesure to the drive cylinder 290 of the loader assembly 62, and at the same time the elevator down solenoid 400 is cut out of circuit so as to block down movement of the elevator during operation of the loader assembly 62. The head section 292 of the loader assembly 62 is then moved outwardly or extended from the position shown in FIG. 5 to the position shown in FIG. 9. As the head section 292 of the loader assembly 62 begins its outward movement, the three-way valve 524 is actuated for a first time by a cam recess 556 (see FIG. 5) in the guide shaft 294.

As the outward movement of the head section 292 continues, the tiers of cartons are pushed toward the open end section of the magazine 58 and force the side walls 96 and 98 of the magazine resiliently outwardly, to the position shown in FIG. 9, by flexing the fixed side panels 104 and 106 and moving the movable side panels 108 and 110 outwardly against the spring 112. As the extending movement of the head section continues, the head section is moved into engagement with the side walls 96 and 98 of the magazine 58 to hold the side walls in the outward position relative to each other. Still further movement of the head section 292 presses the container 86 against the plate 178 of the clamp assembly 94 to move the container 86 and the plate 178 from the position shown in FIG. 6 into the position shown in FIG. 9. It should be noted that the cylinder 290 has a much larger bore or piston diameter than the cylinder 180 of the clamp assembly 94 so that the cylinder 290 readily overcomes the opposing force exerted by the cylinder 180 on the plate 178.

During the movement of the head section 292 from the position shown in FIG. 6 to the position shown in FIG. 9, the three-way valve 524 is actuated a second time by movement of a follower into and out of a second cam recess 558 (see FIGS. 5 and 9). When the head section 292 reaches the position shown in FIG. 9, the loader limit switch 412 (see FIGS. 9 and 18) is operated to energize both the container clamp open solenoid 418 and the loader return solenoid 420. Energization of the container clamp open solenoid 418 operates a valve 500 to move the container positioning assembly 94 to the retracted position. The loader assembly 62 is contemporaneously retracted by operation of the valve 460 in response to the energization of the loader return solenoid 420. Operation of the valve 500 also exhausts the cylinder 304 to enable the movable panel 302 of the head section 292 to move downwardly under the weight of the movable side panels 108 and 110 of the magazine 58.

As the loader assembly 62 moves toward the retracted position of FIG. 6, the follower of the three-way valve 524 is moved into and out of a cam recess 558 (see FIG. 9) to actuate the valve 524 for a third time. The third actuation of the valve 524 enables air to flow under pressure from the conduit 528 to the conduit 530 (see FIG. 19). The three-way valve 540 is then operated to exhaust the gate cylinder 520 to the atmosphere so that the gates 124 and 126 pivot from the closed position, shown in FIG. 6, to the open position, shown in FIG. 9, under the influence of a return spring in the cylinder 520. In addition, operation of the valve 524 for the third time connects air through the conduits 530 and 534 to the ejector cylinder 330. The ejector cylinder 330 (see FIG. 12) is then retracted to pivot the ejector plate 332 upwardly from the initial position shown in solid lines in FIG. 12 to the raised position shown in dashed lines in FIG. 12. As the ejector plate 332 is pivoted upwardly, the now filled carton 86 is shoved off the loading platform 88 by a leading forward edge 566 of the plate 332. It should be noted that the head section 292 is partially retracted before the follower of the three-way valve 525 is actuated for a third time by the cam recess 558 so that the head section does not interfere with the movement of the ejector plate 332. The ejector plate 332, when in the raised position, supports the next succeeding empty container above the loading platform 88.

As the loader assembly 62 continues its retracting movement and reaches the position illustrated in FIG. 5, the three-way valve 524 is again operated by the cam recess 556 to block the supply of air to the conduit 530.

When the supply of air is shut off to the pilot actuator 542, the valve 540 is operated to enable air under pressure to flow through the conduit 544 to the gate cylinder 520 to close the gate assembly 122. The ejector cylinder 330 is exhausted to the atmosphere through a line 567 and a flow control assembly 568 and the ejector cylinder 330 is slowly extended as the plate 332 is pivoted to the initial position. It should be noted that a flow control assembly 568 (see FIG. 19) provides a slow, gradual downward movement of the plate 332 and the next empty container onto the loading platform 88.

When the load assembly 62 reaches the retracted position shown in FIG. 5, the loader safety switch 368 is again actuated. Actuation of the switch 368 enables a next succeeding group of cartons on the elevator 60 to be raised into the magazine 58 to begin anew the process of accumulating tiers of cartons in the magazine 58 to fill the next succeeding empty container.

The provision of the by-pass switch 354 allows the operation of the elevator 60 to be controlled by the container sensor switch 164 in the manner described whenever the ejector plate 332 is in its lowered position. However, when the ejector plate 332 is in its raised position, the container sensor switch 164 is by-passed by the open switch 354 so that the elevator 60 can continue to operate even though a succeeding container is not yet in loading position on the platform 88. Thus, operation of the apparatus is speeded up and magazine loading continues to take place while the next container is being lowered into loading position. If no container is present in the tower 54, operation of the elevator 60 will stop as soon as the ejector plate 332 returns to its lowered position.

Although a particular embodiment of the packer assembly 56 has been illustrated in considerable detail for packing containers with tiers or layers of cartons of cigarettes, it will be apparent to those skilled in the art that the packer assembly 56 can be used for filling containers with articles other than cartons of cigarettes. It will also be apparent to those skilled in the art that the structure of the packer assembly 56 can be varied to accumulate articles in the magazine in arrangements other than the illustrated arrangement of five tiers of six articles. Therefore, the appended claims are not to be limited to the particular illustrative structure shown and are intended to cover any modifications which come within the true spirit and scope of the invention.

What is claimed is:

1. Apparatus comprising: an upwardly extending container receiving structure having an open upper portion through which empty containers descend to a loading platform in a lower portion of the structure; container conveyor means for transporting empty containers to the upper portion of said structure; a magazine assembly mounted adjacent to the loading platform of said structure for accumulating a plurality of tiers of articles; sensor means cooperable with said magazine assembly for sensing when a number of tiers of articles corresponding to the size of a container on the loading platform have been accumulated in said magazine assembly; a loader assembly mounted adjacent to said magazine assembly for moving tiers of articles from said magazine assembly into a container on the loading platform of said structure to fill the container with articles when said sensor means senses that a number of tiers of articles corresponding to the size of the container have been accumulated in said magazine assembly; and an ejector assembly mounted in the lower portion of said structure for ejecting a filled container from said structure.

2. Apparatus as set forth in claim 1, wherein: said ejector assembly lowers a next succeeding container onto the loading platform after ejecting a filled container from said structure.

3. Apparatus as set forth in claim 1, wherein: said magazine assembly includes a plurality of side sections which are moved relative to an empty container on the loading platform by accumulation of tiers of articles in said magazine assembly to enable said magazine assembly to be used for accumulating articles of different sizes.

4. Apparatus as set forth in claim 3, wherein: said loader assembly includes an extendible head section which is extended with movement of the side sections of said magazine assembly to enable said head section to engage each tier of articles in said magazine assembly.

5. Apparatus as set forth in claim 3, wherein: said sensor means is mounted on a side section of said magazine assembly for engagement with a container on the loading platform when a number of tiers of articles sufficient to fill the container have been accumulated in said magazine assembly.

6. Apparatus as set forth in claim 1, further including: positioning means adjacent said loading platform for moving an empty container in a first direction to position and hold the container in an overlapping relationship with said magazine assembly, said loader assembly being operable after the container is filled with articles to move both the container and said positioning means in a second direction to move the filled container out of the overlapping relationship with said magazine assembly and to position the filled container for ejection from said structure by said ejector assembly.

7. Apparatus as set forth in claim 1, further including: drive means mounted on said container receiving structure for engaging a container as the container descends downwardly toward said loading platform to prevent the container from becoming hung up in said structure.

8. A container receiving assembly comprising: a loading platform for suporting a container; an upwardly extending structure located above said loading platform for guiding a downward descent of a plurality of empty containers toward said loading platform; a loader assembly mounted adjacent to said loading platform for filling an empty container positioned on said loading platform; and an ejector assembly mounted adjacent to said loading platform for moving a filled container off said loading platform and lowering a next succeeding empty container onto said loading platform.

9. An assembly as set forth in claim 8, wherein: said ejector assembly includes a member which is mounted for pivoting movement from a first position to a second position to move a filled container off said loading platform and to engage the next succeeding empty container, said member being thereafter movable from the second position to the first position to lower the next succeeding empty container onto said loading platform.

10. An assembly as set forth in claim 8, further including: sensor means connected to said loading platform for detecting when a container is located on said loading platform.

11. An assembly as set forth in claim 10, wherein: said loading platform includes roller means for supporting a container, said roller means being moved by the positioning of a container on said loading platform by said ejector assembly to actuate said sensor means.

12. An assembly as set forth in claim 11, wherein: said sensor means includes a spring which normally holds said roller means in raised position and is depressed by said roller means when a container is positioned on said loading platform.

13. An assembly as set forth in claim 8, wherein: said structure includes belt means for guiding the downward movement of empty containers in said structure and preventing the containers from becoming hung up during the downward descent to said loading platform.

14. Apparatus comprising: a magazine for holding a plurality of tiers of articles, said magazine including side panels which are movable upwardly by the accumulation of a plurality of tiers of articles in said magazine to expand the size of said magazine as a function of the number of tiers of articles and the size of the articles accumulated in said magazine; elevator means mounted beneath said magazine for moving tiers of articles upwardly into said magazine; and a loader assembly mounted adjacent to said magazine for moving the tiers of articles out of said magazine when a predetermined number of articles have been accumulated in said magazine.

15. Apparatus as set forth in claim 14, wherein: said loader assembly includes a head section which is expandable upwardly to correspond to the upward movement of the side panels of said magazine to enable said loader assembly to move varying sizes of accumulated tiers of articles from said magazine.

16. Apparatus as set forth in claim 14, wherein: said loader assembly includes a head section which is movable laterally relative to said magazine to move accumulated tiers of articles out of said magazine, said head section including a plurality of plates which are movable relative to each other to extend said head section upwardly as the side panels of said magazine are moved upwardly to enable said head section to engage each tier of articles as the head section is moved laterally relative to said magazine.

17. Apparatus as set forth in claim 16, wherein: said head section is engaged by the movable side panels of said magazine to enable the movable side panels of said magazine to move the plates of said head section from the upwardly extended position to a retracted position after the tiers of articles have been moved from the magazine by said loader assembly.

18. An apparatus for packing containers with cartons, said apparatus comprising: a carton conveyor for transporting laterally extending groups of cartons; a magazine for accumulating laterally extending tiers of the cartons with each tier being formed by a group of the cartons; an elevator means mounted adjacent to said carton conveyor for receiving the groups of cartons from said carton conveyor and for moving each group of cartons upwardly into said magazine to form a laterally extending tier of cartons in said magazine; a loading platform mounted adjacent to said magazine; a tower extending upwardly from said loading platform for holding a plurality of empty containers, said tower having an exit opening adjacent said loading platform; a container positioning assembly mounted adjacent to said loading platform for moving an empty container into an overlapping relationship with said magazine and for holding the empty container against movement relative to said magazine as the container is filled with cartons; a loader assembly mounted adjacent to said magazine for pushing a plurality of tiers of cartons laterally from said magazine into a container on said loading platform to fill the container, said loader assembly pushing the container against said container positioning assembly to move the container out of the overlapping relationship with said magazine and into alignment with said exit opening in the tower; and a container ejector assembly for moving a filled container through said opening and off said loading platform.

19. Apparatus as set forth in claim 18, wherein: said carton conveyor includes a plurality of rollers and a drive means for rotating said rollers to advance groups of cartons along said carton conveyor; and said elevator means includes a plurality of rollers which are rotated by said drive means when said elevator means is in a lowered position to transfer groups of cartons from said carton conveyor to said elevator means.

20. Apparatus as set forth in claim 18, further including: a container conveyor means for transporting empty containers to an opening in an upper end portion of said tower; and belt means in said tower for moving empty containers downwardly in said tower, said belt means being connected in driving engagement with said container conveyor means for operation contemporaneously with container conveyor means.

21. Apparatus as set forth in claim 18, wherein: said magazine includes side panels which extend into the empty container and are moved upwardly to engage an inner upper surface of the empty container by the accumulation of the plurality of tiers of cartons in said magazine to thereby facilitate moving the tiers of cartons from said magazine and into the container.

22. Apparatus as set forth in claim 21, wherein the side panels of said magazine are resiliently movable outwardly relative to each other by the tiers of cartons as the cartons are pushed into the container by said loader assembly to move the side panels into engagement with upwardly extending, inner side surfaces of the container.

23. Apparatus as set forth in claim 18, further including: sensor means connected to said loading platform to detect when a container is located on said loading platform, said loading platform including a pivotally mounted roller supporting a container, and said sensor means including a spring urging said pivotally mounted roller upwardly, said pivotally mounted roller being pressed downwardly against said spring by a container on said loading platform to actuate said sensor means.

24. Apparatus comprising: a loading platform for supporting an empty container; a magazine assembly mounted adjacent to said loading platform for accumulating a plurality of tiers of articles; sensor means mounted on said magazine assembly for engaging the empty container when a number of tiers of articles sufficient to fill the container have been accumulated in said magazine assembly; and a loader assembly mounted adjacent to said magazine assembly for moving tiers of articles from said magazine assembly into the container on said loading platform to thereby fill the container with articles when said sensor means senses that a number of tiers of articles corresponding to the size of the container have been accumulated in said magazine assembly.

25. Apparatus as set forth in claim 24, wherein: said magazine assembly includes a plurality of side sections which are moved relative to the container on said loading platform by the accumulation of tiers of articles in said magazine assembly to enable said magazine assembly to be used for accumulating articles of different sizes, said sensor means being mounted on a side section of said magazine assembly for movement into engagement with an inner surface of the container to thereby sense when a sufficient number of articles to fill the container have been accumulated in said magazine assembly.

26. An apparatus as set forth in claim 24, further including: an elevator for lifting the tiers of articles a tier at a time into said magazine assembly, said loader assembly being operated to push the tiers of articles off said elevator and into the container when said sensor means detects that the last tier of articles lifted into said magazine assembly by said elevator provides a sufficient number of articles in said magazine assembly to fill the container.

27. Apparatus as set forth in claim 24, wherein: said loader assembly moves the container out of engagement with said sensor means when the loader assembly moves the tiers of articles from said magazine assembly into the container.

28. An apparatus comprising: a loading platform for supporting an empty container; a magazine assembly mounted adjacent to said loading platform for accumulating a plurality of tiers of articles, said magazine assembly having an inlet and an outlet; first means mounted adjacent to said loading platform and responsive to the positioning of a container on said loading platform for moving the container into an overlapping relationship with said magazine assembly outlet; second means mounted adjacent to said magazine assembly and responsive to the presence of a tier of articles for moving the tier of articles into said magazine assembly through said magazine assembly inlet; third means mounted adjacent to said magazine assembly and responsive to the accumulation of a predetermined number of tiers of articles in said magazine assembly for pushing said predetermined number of tiers of articles from said magazine assembly into the container to fill the container; and fourth means mounted adjacent to said loading platform and responsive to the operation of said third means for moving the filled container off said loading platform.

29. Apparatus as set forth in claim 28, wherein: said first means includes a sensor switch which is actuated by the positioning of the container on said loading platform.

30. Apparatus as set forth in claim 28, wherein: said second means includes a plurality of interlock switches, each switch of said plurality of interlock switches being actuated by an article of the tier of articles to thereby detect the presence of the tier of articles.

31. Apparatus as set forth in claim 28, wherein: said magazine assembly includes a sidewall which is movable relative to the container on said loading platform; and said third means includes a sensor assembly connected to said sidewall and movable into engagement with the container by moving said sidewall relative to the container to thereby sense when the predetermined number of tiers of articles have been accumulated in said magazine assembly.

32. pparatus as set forth in claim 28, wherein: said third means includes a loader assembly which is movable to an extended position to shove the predetermined number of tiers of articles from the magazine assembly and into the container; and said fourth means includes an actuator assembly which is operated by said loader assembly as said loader assembly is retracted from said extended position whereby said fourth means moves the filled container off the loading platform after said loader assembly has been partially retracted from said extended position.

33. Apparatus comprising: a loading platform for supporting an empty container; a magazine mounted adjacent to said loading platform for accumulating articles; feeder means for introducing articles sequentially into said magazine; a loader mounted adjacent to said magazine for moving a predetermined accumulation of articles from said magazine into a container on said loading platform; an ejector mounted adjacent said loading platform for ejecting a filled container from said loading platform; and control means for controlling the operation of said feeder means, said control means including sensor means associated with said loading platform for effecting operation of said feeder means when a container is positioned on said loading platform, and by-pass means responsive to operation of said ejector for by-passing said sensor means and effecting operation of said feeder means for a limited time when a container is not positioned on said loading platform.

34. Apparatus as set forth in claim 33 further characterized in that: said ejector is movable back and forth between a first position and a second position, the movement of said ejector from said first position to said second position being effective to eject a filled container from said loading platform and the movement of said ejector from said second position to said first position being effective to guide an empty container into position on said loading platform, and said by-pass means being operable to by-pass said sensor means during the time when said ejector is displaced from said first position, whereby operation of said feeder means is continued during ejection of a filled container from said loading platform and movement of an empty container into position on said loading platform.

References Cited

UNITED STATES PATENTS

| 2,900,773 | 8/1959 | Koch | 53—62 |
| 2,924,051 | 2/1960 | More | 53—62 X |
| 3,396,505 | 8/1968 | McCrudden | 53—164 X |

TRAVIS S. McGEHEE, Primary Examiner

U.S. Cl. X.R.

53—62, 164, 250